United States Patent
Chang et al.

(10) Patent No.: US 11,836,927 B2
(45) Date of Patent: Dec. 5, 2023

(54) BOREHOLE CORING RECONSTRUCTIONS USING BOREHOLE SCANS

(71) Applicant: Halliburton Energy Services, Inc., Houston, TX (US)

(72) Inventors: Paul Chin Ling Chang, Cypress, TX (US); Ahmed Elsayed Fouda, Spring, TX (US); Burkay Donderici, Pasadena, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 984 days.

(21) Appl. No.: 16/634,468

(22) PCT Filed: Apr. 24, 2019

(86) PCT No.: PCT/US2019/028930
§ 371 (c)(1),
(2) Date: Jan. 27, 2020

(87) PCT Pub. No.: WO2020/219035
PCT Pub. Date: Oct. 29, 2020

(65) Prior Publication Data
US 2021/0239878 A1 Aug. 5, 2021

(51) Int. Cl.
*G06T 7/13* (2017.01)
*E21B 49/06* (2006.01)
(Continued)

(52) U.S. Cl.
CPC .............. *G06T 7/13* (2017.01); *E21B 49/06* (2013.01); *G01V 11/00* (2013.01); *G06F 18/28* (2023.01)

(58) Field of Classification Search
CPC .......... G06T 7/13; G06T 7/136; G06T 7/149; G06T 7/564; G06T 2207/20161;
(Continued)

(56) References Cited

U.S. PATENT DOCUMENTS 3,060,373 A 10/1962 Henri-Georges
3,132,298 A 5/1964 Henri-Georges et al.
(Continued)

FOREIGN PATENT DOCUMENTS

CA 685727 A 5/1964
KR 20120017639 A 2/2012
(Continued)

OTHER PUBLICATIONS 3D numerical reconstruction of well-connected porous structure of rock using fractal algorithms, Yang Ju et al., ScienceDirect, published Jul. 1, 2014, https://www.sciencedirect.com/science/article/pii/S0045782514002217. (Year: 2014).*
(Continued)

*Primary Examiner* — Catherine T. Rastovski
*Assistant Examiner* — Lal C Mang
(74) *Attorney, Agent, or Firm* — DELIZIO, PEACOCK, LEWIN, & GUERRA

(57) ABSTRACT

An apparatus includes a processor and a machine-readable medium having program code executable by the processor to cause the apparatus to obtain a scan result based on a core sample, generate a set of contours of the scan result, and generate a set of object associations, wherein the set of object associations includes a first object association that is associated with a first contour from the set of contours and a second contour from the set of contours. The program code also generates a set of contour connections, wherein the set of contour connections includes a first contour connection that is based on the first object association. The program code also generates a reconstructed core having a three-dimensional space based on the set of contour connections, wherein the three-dimensional space includes a volume greater than the core sample.

20 Claims, 14 Drawing Sheets

(51) Int. Cl.
G01V 11/00 (2006.01)
G06F 18/28 (2023.01)

(58) Field of Classification Search
CPC ........... G06T 2207/30181; E21B 49/06; E21B 47/002; E21B 47/0025; G01V 11/00; G06F 18/28

See application file for complete search history.

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 6,191,588 | B1 | 2/2001 | Chen |
| RE42,493 | E | 6/2011 | Tabarovsky |
| 8,579,037 | B2 | 11/2013 | Jacob |
| 2009/0259446 | A1* | 10/2009 | Zhang ............... E21B 49/00 703/2 |
| 2013/0170713 | A1 | 7/2013 | Kumar et al. |
| 2015/0043787 | A1 | 2/2015 | Fredrich et al. |
| 2015/0146935 | A1 | 5/2015 | Mezghani |
| 2015/0279093 | A1 | 10/2015 | Sung et al. |
| 2017/0286802 | A1* | 10/2017 | Mezghani ............ G06T 7/0002 |

FOREIGN PATENT DOCUMENTS

| WO | 2009126881 A2 | 10/2009 |
|---|---|---|
| WO | 2019177588 A1 | 9/2019 |

OTHER PUBLICATIONS

Meinguet, et al., "Multivariate Interpolation at Arbitrary Points Made Simple", Journal of Applied Mathematics and Physics ZAMP, vol. 30, 1979, pp. 292-304.
PCT Application Serial No. PCT/US2019/028930, International Search Report, dated Jan. 23, 2020, 3 pages.
PCT Application Serial No. PCT/US2019/028930, International Written Opinion, dated Jan. 23, 2020, 4 pages.
Belongie, et al., "Shape Matching and Object Recognition Using Shape Contexts", IEEE Transactions on Pattern Analysis and Machine Intelligence, vol. 24, No. 24, Apr. 2002, pp. 509-522.
Bize, et al., "Virtual Core: State-of-the-Art Wireline Technologies to Provide a Viable Substitute for Whole Conventional Coring", Offshore Techology Conference, Oct. 2015, 13 pages.
Caselles, et al., "Geodesic Active Contours", International Journal of Computer Vision, vol. 22, No. 1, 1997, pp. 61-79.
Hurley, et al., "Method to Generate Full-Bore Images Using Borehole Images and Multipoint Statistics", Society of Petroleum Engineers, 120671, 2011, pp. 204-214.
Kass, et al., "Snakes: Active Contour Models", Schlumberger Palo Alto Research, International Journal of Computer Vision, 1987, pp. 321-331.
Li, et al., "Distance Regularized Level Set Evolution and Its Application to Image Segmentation", IEEE, vol. 19, No. 12, 2010, pp. 3243-3254.
Veltkamp, et al., "State-of-the-Art in Shape Matching", Technical Report UU-CS-1999-27, 1999, pp. 1-26.
Chen, et al., "A Novel Array Laterolog Method", The Log Analyst, 39(5), Jan. 1, 1998, pp. 23-33.
Davies, et al., "Azimuthal Resistivity Imaging: A New Generation Laterolog", SPE Formation Evaluation, 9(3), Jan. 1, 1994, pp. 165-174.
Guner, et al., "Quantitative Demonstration of a High-Fidelity Oil-Based Mud Resistivity Imager Using a Controlled Experiment", Paper presented at the SPWLA 61st Annual Logging Symposium, Virtual Online Webinar, Jun. 2020. doi: https://doi.org/10.30632/SPWLA-5010, 11 pages.
Safinya, et al., "Improved Formation Imaging With Extended Microelectrical Arrays", Paper presented at the SPE Annual Technical Conference and Exhibition, Dallas, Texas, Oct. 1991. doi: https://doi.org/10.2118/22726-MS, 12 pages.
Smits, et al., "High Resolution From a New Laterolog With Azimuthal Imaging", SPE 30584, SPE Annual Technical Conference and Exhibition, Oct. 22-25, Dallas, Texas, Jan. 1, 1995, pp. 563-576.
Suau, et al., "The Dual Laterolog-Rxo Tool", Fall Meeting of the Society of Petroleum Engineers of AIME, Oct. 8-11, 1972, San Antonio, Texas, 44 pages.
Vigne, et al., "Strange Invasion Profiles: What Multiarray Induction Logs Can Tell US About How Oil-Based Mud Affects the Invasion Process and Wellbore Stability", Paper presented at the SPWLA 38th Annual Logging Symposium, Houston, Texas, Jun. 1997., 12 pages.

* cited by examiner

BOREHOLE CORING RECONSTRUCTIONS USING BOREHOLE SCANS

BACKGROUND

The disclosure generally relates to the field of subsurface characterization and more particularly to formation core analysis.

Core analysis of a core sample from a borehole in a formation provides a means of measuring downhole conditions to determine formation properties such as permeability, porosity, and other characteristics of the formation/borehole. In addition, a core analysis is useful for well log calibration and providing direct evidence of the presence, distribution, and deliverability of hydrocarbon. Core analysis provides important information useful to determine the optimal values for various parameters during formation drilling and hydrocarbon production such as when to drill, what a target depth for fracturing should be, which wells to inject with fluids, etc.

During conventional coring operations, the operator first drills the well down to a zone of interest using a drill bit and drill string. The timing requirements of such a drilling operation, safety risks, expense and difficulties in acquiring a sufficient number of representative core samples all inhibit effective core analysis operations. Methods of core analysis which reduce the reliance on conventional coring operations increases the accuracy of formation properties determined from core analysis.

BRIEF DESCRIPTION OF THE DRAWINGS

Embodiments of the disclosure can be better understood by referencing the accompanying drawings.

DESCRIPTION OF EMBODIMENTS

Figure 1:
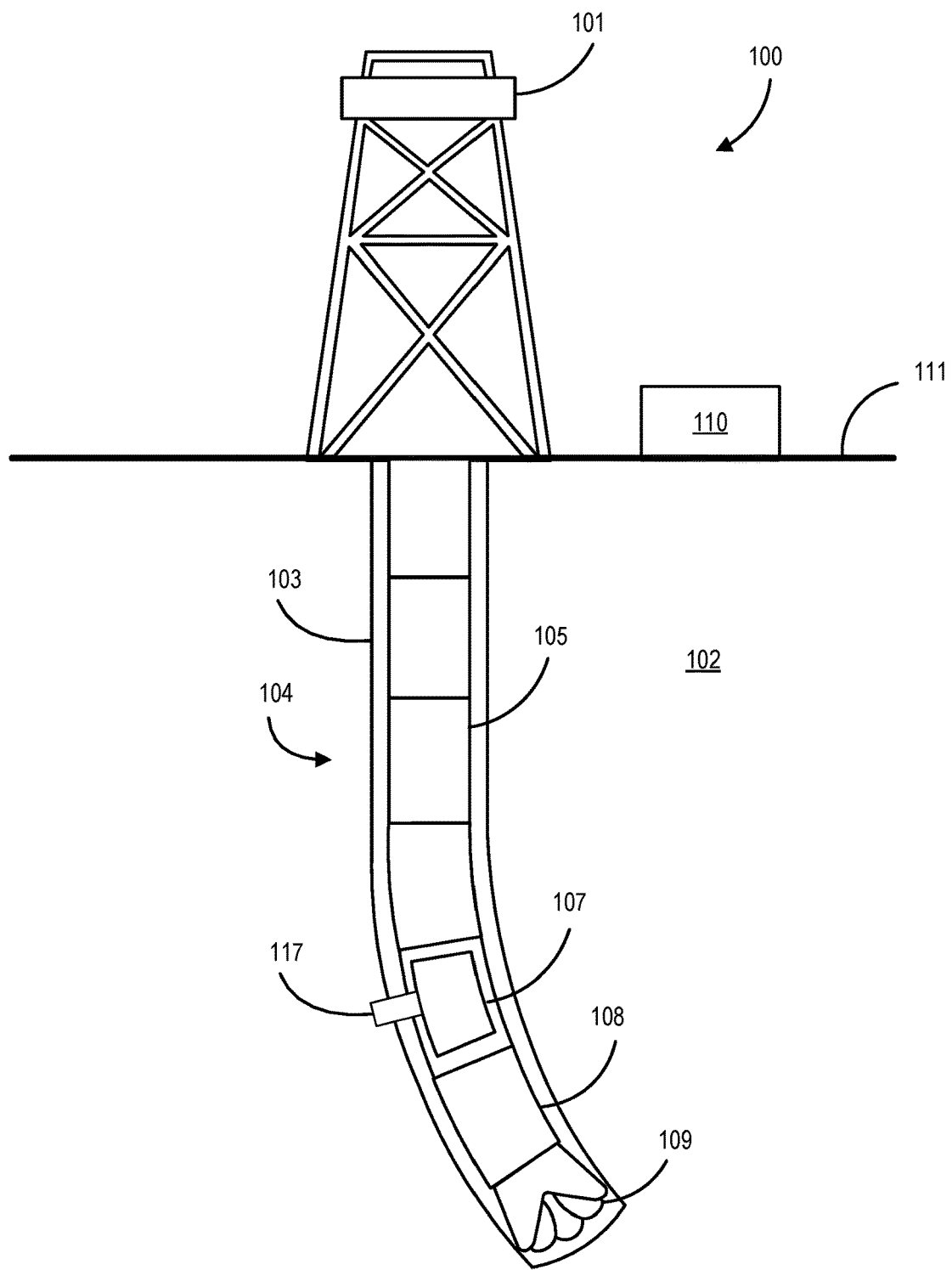
FIG. 1 is an elevation view of an onshore drilling system operating a downhole drilling assembly that includes a borehole scanning system.

The description that follows includes example systems, methods, techniques, and program flows that embody embodiments of the disclosure. However, it is understood that this disclosure can be practiced without these specific details. For instance, this disclosure refers to using results from an ultrasound scanning system. Aspects of this disclosure can instead be applied to other scanning systems such as resistivity scanning systems. In other instances, well-known instruction instances, protocols, structures and techniques have not been shown in detail in order to avoid obfuscating the description.

Various embodiments relate to a subsurface formation property determination system. A system can scan a borehole using one or more scanning systems to produce a set of scan results corresponding with the surface or interior of a core sample. After obtaining the scan results during a core reconstruction process, the system can use a core reconstruction method to generate a set of feature contours from a scan result. In some embodiments, the system can first generate a set of digitized masks corresponding with different intensity ranges of the scan results and then generate sets of feature contours from the digitized masks. Each of the feature contours represent a contour of a core feature distinguishable in a scan result (e.g. a pore/porous material, a specific composition, a distinct material phase, a distinguishable mineral mixture, etc.). Various methods can be used to generate feature contours from scan results/digitized masks, such as a level set evolution method involving the use of level set function (LSF) and edge indicator function.

During core reconstruction, the feature contours can be associated to each other. The feature contour association can implicitly or explicitly generate an object from the association, wherein an object represents an actual or predicted core feature in a formation core sample. In some embodiments, this association between the feature contours that generates an object or corresponds with an existing object ("object association") can be direct. For example, a system can associate a first identified feature contour to a second identified feature contour in a relational database. Alternatively, the association of feature contours can be indirect, wherein feature contours are associated to a shared object and can be determined to be associated based on the shared object. In some embodiments, the object associations can be determined by associating contour points corresponding with different feature contours to each other based on their respective shape descriptors, wherein a similarity metric can be calculated from the respective shape descriptors and compared to a similarity threshold to determine whether or not to generate an object association. For example, a similarity metric can be calculated based on a comparison between shape descriptors such as the number of sides, area, perimeter, curvature inflection points, etc. A simple example for a similarity metric S calculated as a weighted sum of ratios of shape descriptors is shown below in Equation 1 below, wherein $C_1$ is a first weight, $C_2$ is a second weight, $A_i$ is the area of object i, $A_j$ the area of object j, $P_i$ is the perimeter of object i, and $P_j$ the perimeter of object j:

$$S = C_2 \frac{A_i}{A_j} + C_2 \frac{P_i}{P_j} \qquad (1)$$

Using the object associations, the system can generate a set of contour connections, wherein each contour connection can be represented by a function or set of values. The contour connection can be used to determine a size, shape, or spatial coordinates corresponding with an object. The contour connections can be a function that provides at least one of a line, plane, or volume representing a core feature that includes a set of contour points corresponding with the object association(s) used to generate the contour connection. In addition, the system can generate a second contour connection that is generated to avoid the first contour connection by at least a pre-determined distance threshold. By applying extrapolation on the set of contour connections to a three-dimensional space, the system can generate a reconstructed core having a volume greater than the volume of the core sample (i.e. the digital representation of volume for the reconstructed core is greater than the digital representation of volume for the core sample).

The ability of the system to generate an arbitrarily large (or small) reconstructed core can increase the efficiency of core analysis studies and reduce the number of core samples required to determine the formation properties. In addition, the reconstructed core can include features that are lost or under-represented by core samples obtained from conventional coring methods. The methods described herein can also be applied to multiple overlaid scans of a borehole, increasing the accuracy and confidence in the validity of reconstructed cores corresponding with that borehole.

Example Well Systems

FIG. 1 is an elevation view of an onshore drilling system operating a downhole drilling assembly that includes a borehole scanning system. A drilling system 100 includes a rig 101 located at a formation surface 111 and positioned above a borehole 103 within a subterranean formation 102. In certain embodiments, a drilling assembly 104 can be coupled to the rig 101 using a drill string 105. In other embodiments, the drilling assembly 104 can be coupled to the rig 101 using a wireline or a slickline, for example. The drilling assembly 104 can include a bottom hole assembly (BHA). The BHA can include a drill bit 109, a steering assembly 108, and a scanning tool 107 as either a logging-while-drilling (LWD) tool or a measurement-while-drilling (MWD) tool. The scanning tool 107 can include one or more scanning/imaging devices to scan the borehole 103 (e.g. scanning the inner walls of the borehole 103) and/or a side-wall corer 117 to acquire a core sample. The scanning tool 107 can scan the core sample using various scanning systems. In some embodiments, the scanning tool 107 can scan the core sample using at least one of a sonic device to acquire acoustic scan results, an electromagnetic sensor to provide resistivity scan results, optical cameras to provide visual scan results, etc. Alternatively, the scanning tool 107 can transport the core sample to the surface 111 to perform surface core scans using surface equipment. In addition, or alternatively, the scan result can be obtained by using the scanning tool 107 to scan the inner wall of the borehole 103.

A control and analysis system 110 located at the formation surface 111 can include a processor and memory device and can communicate with elements of the BHA (e.g., the scanning tool 107, the steering assembly 108, etc.). The control and analysis system 110 can obtain scan results from the scanning tool 107 or other scanning devices and send control signals to the BHA or components thereof. Additionally, in some embodiments, at least one processor and memory device can be located downhole within the BHA for the same purposes. The scanning tool 107 can scan the core sample from the subterranean formation 102 both while the borehole 103 is being drilled and after the borehole 103 is drilled to provide information regarding the subterranean formation. The control and analysis system 110 can also generate a reconstructed core(s) based on obtained scan results and determine formation properties based on the reconstructed core(s) using the operation described below for FIG. 3 and FIG. 4. In some embodiments, the direction or speed of the drill bit 109 can be changed based on the determined formation properties. The control and analysis system 110 can obtain scan results from the scanning tool 107 while the scanning tool 107 is in motion. Alternatively, or in addition, the control and analysis system 110 can obtain scan results while the scanning tool 107 is stationary.

Modifications, additions, or omissions can be made to the example system described in FIG. 1 without departing from the scope of the present disclosure. For example, the scanning tool 107 can include more than one scanning device to perform simultaneous scanning. Moreover, components can be added to or removed from the drilling system 100 without departing from the scope of the present disclosure.

Figure 2:
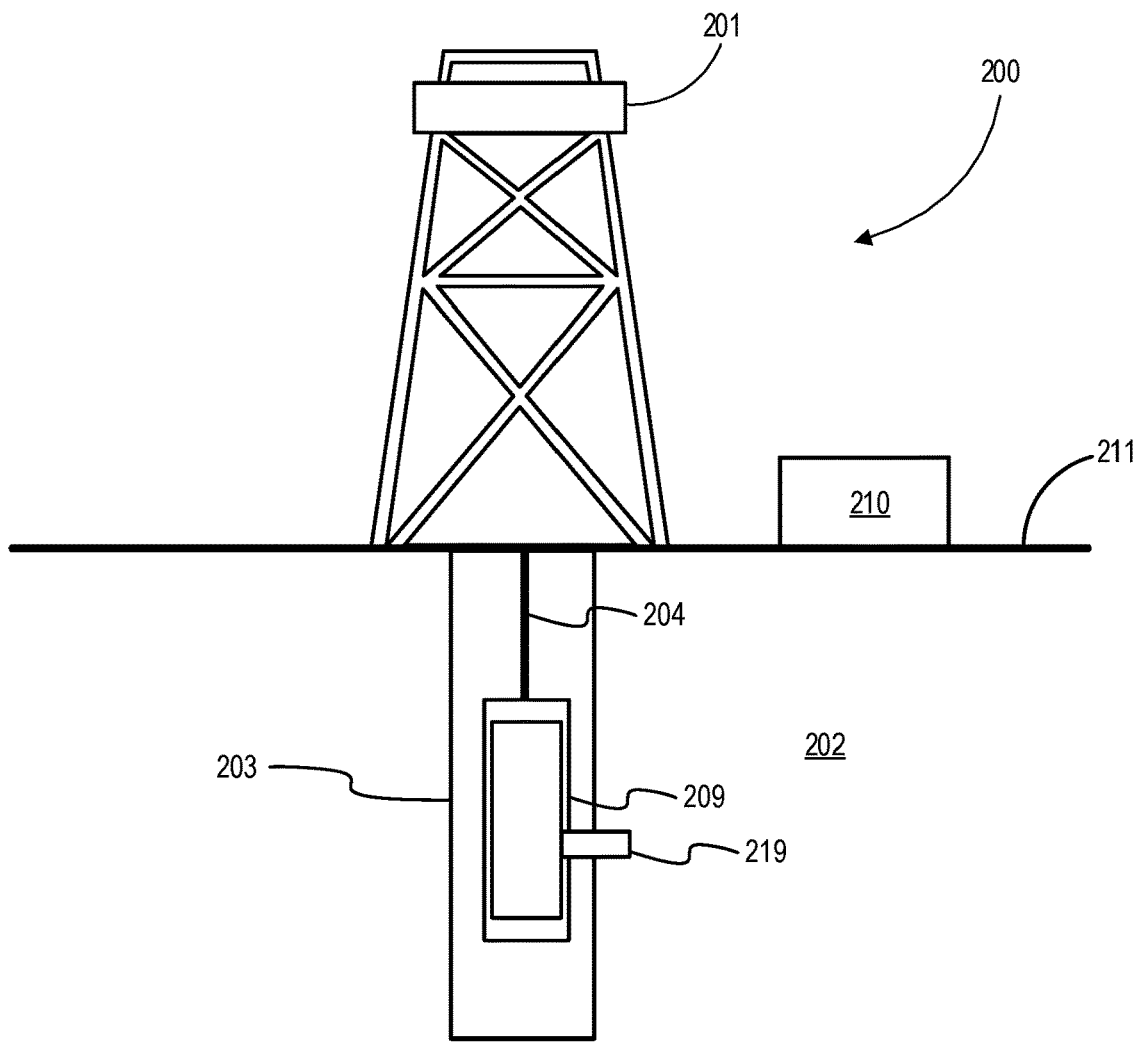
FIG. 2 is an elevation view of an onshore wireline system operating a wireline tool that includes a borehole scanning system.

FIG. 2 is an elevation view of an onshore wireline system operating a wireline tool that includes a borehole scanning system. A wireline system 200 includes a rig 201 located at a surface 211 and positioned above a borehole 203 within a subterranean formation 202. The wireline system 200 can include a wireline 204 supporting a scanning tool 209 that includes a side-wall corer 219, wherein the scanning tool 209 is part of a wireline tool. The side-wall corer 219 can extract a core sample which can be used to collect various types of information about the borehole 203 and the subterranean formation 202 such as porosity, resistivity, hydrocarbon presence, gas presence, etc. A control and analysis system 210 located at the surface 211 can include a processor and memory device and can communicate with elements of the scanning tool 209. The scanning tool 209 can include one or more scanning/imaging devices to scan the core sample and provide scan results. For example, the scanning tool 209 can include a sonic device to acquire acoustic scan results, an electromagnetic sensor to provide resistivity scan results, optical cameras to provide visual scan results, etc. Alternatively, the scanning tool 209 can transport the core sample to the surface, where the core sample can be scanned using scanning equipment at the surface to provide scan results. The control and analysis system 210 can obtain scan results from the scanning tool 209 while the scanning tool 209 is in motion. Alternatively, or in addition, the control and analysis system 210 can obtain scan results while the scanning tool 209 is stationary. In addition, or alternatively, the scanning tool 209 can scan the inner wall of the borehole 203 to obtain scan results.

Example Flowcharts

Figure 3:
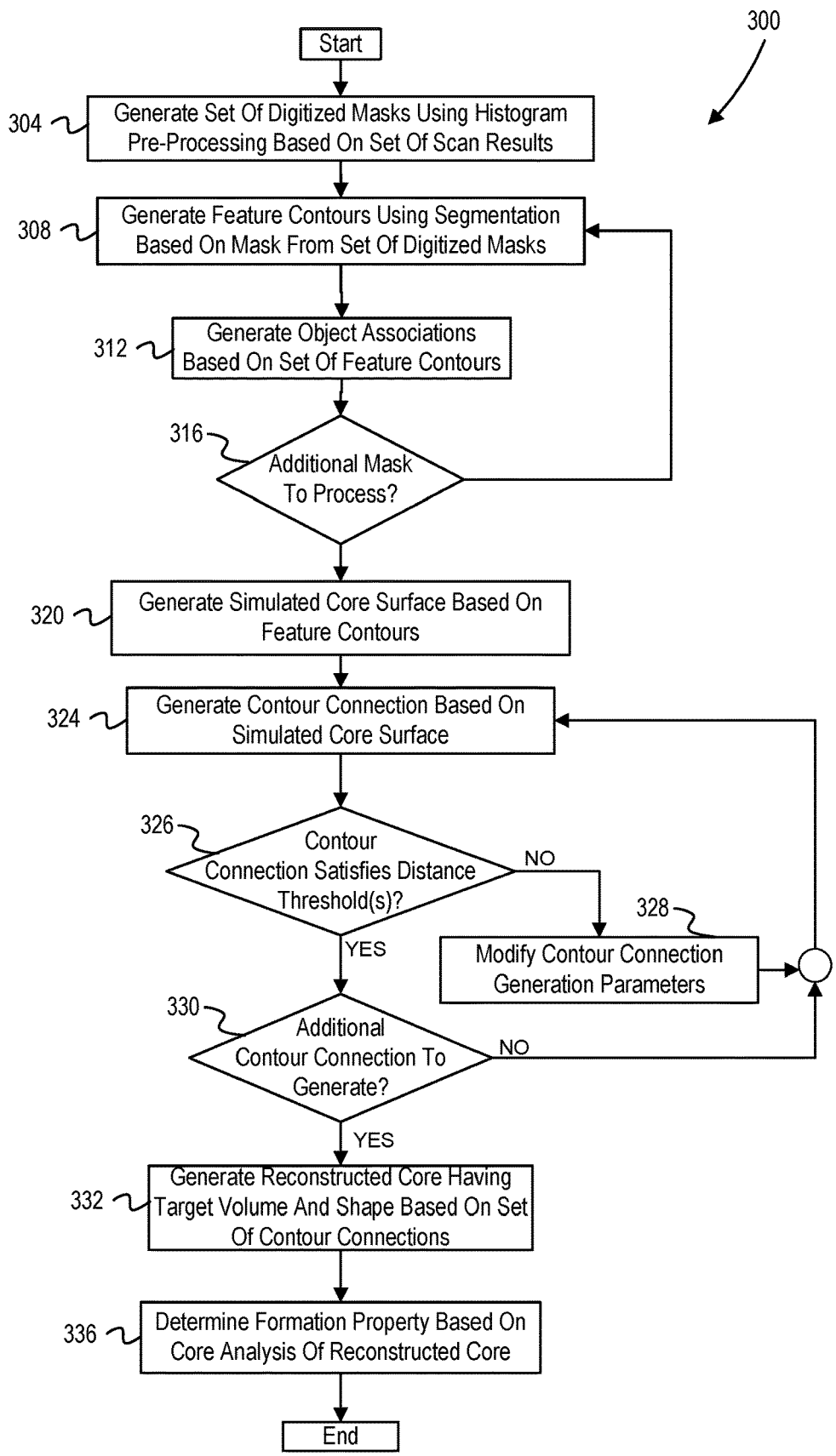
FIG. 3 depicts a flowchart of operations to generate a reconstructed core.

FIG. 3 depicts a flowchart of operations to generate a reconstructed core. FIG. 3 depicts a flowchart 300 of operations that are described with reference to a system comprising a processor. Operations of the flowchart 300 start at block 304.

At block 304, the system generates a set of digitized masks using histogram pre-processing based on a set of scan results. The scan results can be obtained from various types of borehole scans across a section of a borehole core sample. For example, a scan result can be a 360-degree acoustic scan result across an entire perimeter of the borehole core sample.

With reference to FIGS. 1-2 above, the scan results can be provided by the scanning tool 107, sensors attached to the wireline 204, and/or the scanning tool 209. Once obtained, the system can analyze the intensity values of the individual elements of the scans to generate an intensity range. Based on the intensity range, the system can apply a histogram pre-processing method to divide the set of scan results into a one or more sets of digitized masks.

In some embodiments, the scan result can be stored in an array wherein each element of the array represents the measurement at a spatial position and stores one or more values corresponding with an intensity value at the spatial position. In some embodiments, the array can be represented as an image and each element can be described as a pixel. The system can generate a histogram of different intensity bins that tracks the number of pixel occurrences in each bin of the histogram. For each bin in the histogram, the system can generate a digitized mask (e.g. a two-dimensional array of boolean values) that can provide an assessment of whether the one or more values are greater than or less than an intensity threshold corresponding to the corresponding intensity bin, which can result in a linear or nonlinear increase of in intensity threshold values depending on the sizes of the intensity bins. For example, the system can divide each scan result into a number (N) of intensity bins, wherein each of the N intensity bins corresponds with an intensity range. In some embodiments, each of the set of N intensity bins can be associated with a distinct feature type. For example, a first feature type can be empty space (e.g. a pore), a second feature type can be a first mineral type (e.g. perovskite), etc. In some embodiments, the number and ranges of the intensity bins can be manually changed.

In some embodiments, a system can apply binning heuristics to determine what set of intensity bins and corresponding intensity ranges to use. The system can the determine the set of intensity bins and corresponding intensity ranges based on a pre-determined number and total intensity range of a scan result. The system can then apply multivariate optimization to obtain the ranges for each intensity bin wherein the multivariate optimization is to determine a distinct range of values that corresponding with a distinct intensity value or geological feature type. For example, if $w=[w_1, \ldots w_n, \ldots w_n]$ are the unknown vectors of intensity range boundary values and $I_n$ represents the sum of intensity for all pixels within the n-th intensity bin, then the following equation can be used to perform the multivariate optimization, wherein a multivariate optimization scheme determines the set of w that maximizes the difference in sum across all intensity bins:

$$w = \mathrm{argmax} \frac{1}{2} \sum_n \sum_m \|I_n(w) - I_m(w)\|^2 \quad (n \neq m) \quad (1)$$

At block 308, the system generates feature contours using segmentation based on a mask from the set of digitized masks. In some embodiments, the system can select the mask in an iterative manner through the set of digitized masks (e.g. from an index value of zero to the number of bins). In some embodiments, the system can apply a geometric active contours (GAC) method, also known as a level set method, to determine a feature contour from a mask. The level set method can represent contours of complex topology and can handle various topological changes, such as splitting and merging, in an efficient way compared to other active contour methods. In addition, the system can apply the level set method independently of any parametrized points on the feature contours. During the level set method, a level set function (LSF) can be formulated, wherein the solution set formed by LSF=0 defines the boundaries of a contour dividing elevated intensity values from background intensity values. The LSF can be used to determine a feature contour using level set evolution. For example, a LSF can be $\phi$ in the following function, where x is a first spatial dimension, y is a second spatial dimension and t is an intensity value, and F is a force function that can be used to control contour motion:

$$\frac{\partial \phi(x, y, t)}{\partial t} = F|\nabla \phi(x, y, t)| \quad (2)$$

In some embodiments, an edge indicator function g can be used, wherein g has smaller values at the edges/boundaries of a feature contour due a change in intensity values. In some examples, the edge indicator function g can be represented using Equation 3 below, where g is the edge indicator function, $G_\sigma$ is a gaussian kernel with a standard deviation of $\sigma$, I represents the set of intensity values corresponding to the mask to be segmented, and the convolution of $G_\sigma$ and I is used to smooth the digitized mask and reduce noise during edge detection:

$$g = \frac{1}{1 + |\nabla G_\sigma * I|^2} \quad (3)$$

In some embodiments, the edge indicator function can be directly incorporated into the formulation of the level set contour evolution. For example, a geodesic active contour function can be used below, wherein the force function F in Equation 2 is a function representing multiplication by a constant $\alpha$:

$$\frac{\partial \phi}{\partial t} = g|\nabla \phi| div\left(\frac{\nabla \phi}{|\nabla \phi|}\right) + \nabla g \cdot \nabla \phi + \alpha g|\nabla \phi| \quad (4)$$

In some embodiments, the contour solution defined and embedded as the zero level set of the LSF (i.e. a slice of LSF at the $\phi=0$ plane) can be included in the set of contours defining distinct core features. In addition, the system can determine that the LSF satisfies additional constraints, such as enforcing the stability, numerical accuracy, and continuity of the LSF across an entire solution set. Additional LSF constraints can including a constraint on the derivative of the LSF across a spatial region and that the LSF satisfies unique property of signed distance functions ($|\nabla \phi|=1$). One approach to enforcing these constraints can be to use a distance-regularized level set evolution (DRLSE), wherein the DRLSE method intrinsically enforces the signed distance property during level set evolution.

The system can pre-determine which of the feature contours should be explicitly represented and which should be set as a "background" based on the intensity values corresponding with each feature contour. For example, a system can determine that a particular feature contour having a particular intensity value has a total area greater than a background area threshold (e.g. 60%) and set all feature contours and/or objects associated with the particular feature contour as a background. As described further below for block 324, feature contours and their corresponding associated objects that are set as "background" can have a lower priority in a core reconstruction priority heuristic.

At block 312, the system generates a set of object associations based on the set of feature contours. The system can generate the set of object associations by associating feature contours to object(s). The set of object associations can be used determine which feature contours are part of the same object. Operations describing a method of generating the set of object associations based on feature contours are described further below with respect to FIG. 4. As further described for FIG. 4 below, the generation of the object associations can include the generation of one or more point-to-point pairings and corresponding point-to-point transformations that can be used directly or indirectly to generate contour connections.

At block 316, the system determines whether there are additional masks to process. If there are additional masks to process from the set of digitized masks, the system returns to block 308. Otherwise, the system proceeds to block 320.

At block 320, the system generates a simulated core surface based on the feature contours. The system can generate the simulated core surface by projecting each of the feature contours onto the scanned surface area of the core sample discussed above at block 304. The process can be visualized as "rolling" one or more masks having associated contours onto a core sample geometry. For example, with reference to FIG. 10 below, the contours shown in the overlaid masks 1010 can be "rolled" around to the surface of the reconstructed core 1020.

At block 324, the system can generate a contour connection based on the simulated core surface. In some embodiments, the system can generate contour connections using priority heuristics determined from the feature contours on the simulated core surface. The priority heuristics can be used to determine the order of contour connection generation based on priority values associated with at least one of the feature contours, their corresponding contour points, their corresponding point-to-point pairings, and their corresponding point-to-point transformations. For example, some priority heuristics can include instructions to rank point-to-point pairing priority values based on the intensity values of the contour points. Some priority heuristics can include instructions to rank the priority of point-to-point pairings by the order of the average value of the intensity range associated with the digitized mask corresponding with the point-to-point pairing. Some priority heuristics can include instructions to prioritize point-to-point pairings in order of the number of distinct feature contours in their corresponding digitized masks. Some priority heuristics can include instructions to prioritize the point-to-point pairings in order of the number of objects predicted based on their corresponding digitized masks. Some priority heuristics can include instructions to prioritize the point-to-point pairings in order of the correspondence values corresponding with the contour points of the point-to-point pairings.

The priority heuristics can include multiple instructions. In one example priority heuristic, the example priority heuristic can include instructions to first prioritize point-to-point pairings based on the number of objects predicted based on their corresponding digitized masks. Within each subset of point-to-point pairings having the same number of predicted objects, the example priority heuristic can prioritize point-to-point pairings in order of the average value of the intensity range associated with the digitized mask corresponding with the point-to-point pairing. Within each subset of point-to-point pairings having the same priorities using the above two instructions, the example priority heuristic can prioritize point-to-point pairings in order of their intensity values. Within each subset of point-to-point pairings having the same priorities using the above three instructions, the example priority heuristic can prioritize point-to-point pairings in reverse order of the area of their feature contours. The example priority heuristic can set feature contours having an area greater than a background area threshold (e.g. 60%) as a "background" contour with an associated "background" object. For example, the example heuristic can include instructions that a "background" object and its corresponding point-to-point connections should have the lowest priority when determining contour connections.

In some embodiments, the system can use the point-to-point pairings and corresponding point-to-point transformations described above for block 312 to generate the contour connection. Alternatively, the system can generate a new set of point-to-point pairings and a corresponding contour connection. A point-to-point pairing can be used in conjunction with the simulated core surface to generate the contour connection, wherein each of the contour connections represent a functional relationship between spatial coordinates and an indicator of the presence of an object that includes the points of the point-to-point pairing. The contour connection can cover a domain representable by at least one of a line, plane, or three-dimensional shape that includes two points of the point-to-point pairing. The contour connection can be generated using various mathematical or simulation methods, a shortest distance method, a random walk method, etc. In some embodiments, the system can directly use a corresponding point-to-point transform as a contour connection. Alternatively, such as in the case that a distance threshold must be satisfied, the contour connection can be different from the point-to-point transform.

At block 326, the system determines whether the contour connection satisfies one or more distance thresholds. In some embodiments, the contour connection can satisfy a distance threshold when the least distance between the current contour connection and any other contour connection is greater than the distance threshold. For example, if the least distance between the current contour connection and any other contour connection is 2 millimeters and the distance threshold is 6 millimeters, the system can determine that the current contour connection does not satisfy the distance threshold. If the system determines that the current contour connection does not satisfy the distance threshold, the system can proceed to block 328. Otherwise, the system can proceed to block 330.

At block 328, the system modifies a set of contour connection generation parameters used during contour connection generation. In some embodiments, modifying the set of contour connection generation parameters can include adding, changing, or removing parameters used during contour connection generation. The modification of the set of contour connection generation parameters can alter the path or volume of a contour connection during a contour connection generation process. For example, in the case where a contour connection is a straight line, the system can add one or more curvature terms to avoid other contour connections. In some embodiments, the system can modify a set of contour connection generation parameters by re-determining a random walk path. Once the contour connection generation parameters are modified, the system can return to block 324 to generate the current contour connection again.

At block 330, the system can determine whether there are additional contour connections to generate. In some embodiments, the system can determine that there are additional contour connections to generate when at least one point-to-point pairing does not have a corresponding contour connection. If there are additional contours to generate, the system can return to block 324. If there are not additional contours to generate, the system can proceed to block 332.

At block 332, the system generates a reconstructed core having a target volume and shape based on the set of contour connections. Based on the set of contour connections, the system can generate a reconstructed core having a set of feature contours similar to the feature contour of the core sample described above at block 304. In addition, the system can use the set of contour connections to determine the dimensions of the objects inside of the reconstructed core to fill out the entire three-dimensional volume of the reconstructed core, wherein the material associated with the objects can be same as that of the feature contours used to generate the contour connections. For example, if a contour connection is generated from contours associated with the material of "opalinus clay", the system can fill out an object inside of the reconstructed core having a shape based in part on the contour connection that is also associated with the material of "opalinus clay."

In some embodiments, the system can generate a reconstructed core having a different spatial domain in volume and/or shape from a core sample (e.g. the radius of a reconstructed core is 50% greater than a representation of radius of the core sample). To do so, the system can extrapolate the set of contour connections from points within the reconstructed core to the boundaries of the reconstructed core. For example, the system can use the set of contour connections determined using scan results of a core sample having an original shape of a cylinder and extrapolate the contour connections to the boundaries of a reconstructed core having an ellipsoid shape.

At block 336, the system can determine a formation property based on a core analysis of the reconstructed core. The core analysis can include generating a set of simulated slabs based on the reconstructed core. The generation of simulated slabs can be performed by taking virtual slices of the reconstructed core at one or more target orientations and positions. The simulated slabs of the reconstructed core can be used to provide a two-dimensional view at the one or more target orientations and positions and provide anisotropic formation properties.

The core analysis can include other core analysis methods. In some embodiments, the core analysis can include a simulation of hydrocarbon flow through the reconstructed core to determine a formation permeability. The core analysis can also include pore measurements of the reconstructed core to determine a formation porosity and total hydrocarbon volume. The core analysis can include an analysis of the formation composition and structure to determine a formation size and mechanical properties of the formation. In some embodiments, the system can modify a drilling parameter (e.g. drilling speed, drilling direction) or well production parameter (e.g. hydrocarbon production rate or surface pressure) in response to a formation property determined based on a core analysis of the reconstructed core.

Figure 4:
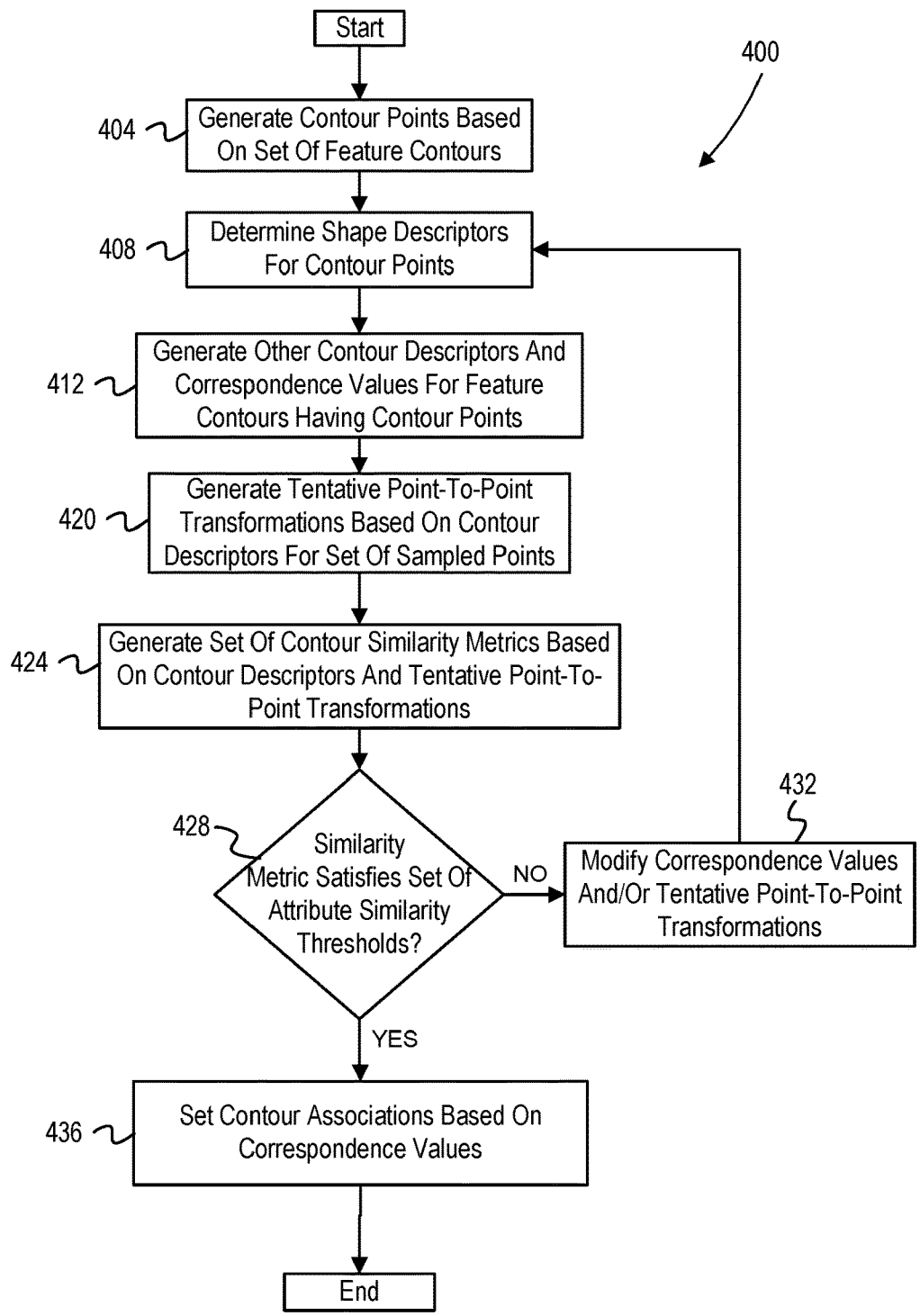
FIG. 4 depicts a flowchart of operations to generate object associations based on a set of feature contours.

FIG. 4 depicts a flowchart of operations to generate object associations based on a set of feature contours. FIG. 4 depicts a flowchart 400 of operations that are described with reference to a system comprising a processor. Operations of the flowchart 400 start at block 404. With further reference to FIG. 3, operations of the flowchart 400 can be performed during operations of block 312.

At block 404, the system generates a set of contour points based on the set of feature contours. In some embodiments, the system can generate the set of contour points by generating a uniformly distributed set of points for each of the feature contours at their contour boundaries. Alternatively, the system can generate the set of contour points both at their contour boundaries and contour interior. Alternatively, the system can generate a randomly distributed set of contour points for each distinct feature contour. During contour point generation, each of the points can be associated with their corresponding feature contour. In addition, the system can apply a filter to remove feature contours below a size threshold. Removal of feature contours below a size threshold can enhance the robustness of the object association process and reduce the effect of measurement noise.

At block 408, the system can determine shape descriptors for the contour points. In some embodiments, the system can determine a shape descriptor (which can be a type of contour descriptor) using methods similar to, or the same as, optical character recognition methods. In some embodiments, the system can determine shape descriptors based on machine learning methods. Examples of machine learning methods can include unsupervised learning methods and supervised learning methods. In some embodiments, the system can apply a combination of unsupervised and supervised learning methods. For example, the system can initially determine shape correspondence values using an unsupervised learning method and use the supervised learning method when a sufficient number of more classifications have been performed using the unsupervised learning method.

Various other methods can be used to determine a shape descriptor for a feature contour. In some embodiments, the system can assign a shape descriptor to each point in a set of contour points that include values describing the relationship between the respective contour point and all the other contour points in the same feature contour. For example, the system can assign a first shape descriptor to a first contour point from a subset of contour points corresponding with a first contour, wherein the first shape descriptor comprises a set of vectors representing the path between the first contour point and some or all the other contour points of the subset of contour points.

At block 412, the system generates other contour descriptors and correspondence values for the feature contours having contour points. The contour descriptors can include general contour attribute information as well as point-specific contour attribute information. For example, the contour descriptors of a first contour point can include general contour attribute information such as the contour size, a value representing the depth of measurement made during a borehole scan, etc. The contour descriptor of the first contour point can also include point-specific contour attribute information such as the intensity value of the contour point, the specific measured depth of the contour point, etc.

After determining the contour descriptors for the feature contours having contour points, the system determines correspondence values for the feature contours. The correspondence values represent a tentative similarity estimate between a first feature contour and a second feature contour and can be based on various contour descriptors such as the shape descriptors, contour size, measurement depth, etc. In some embodiments, the correspondence values can include a correspondence data element including one or more numeric values and associated contour identifiers, wherein the one or more numeric values denote one or more tentative similarity metrics between feature contours. In addition, the system can apply a graph matching solution to efficiently maximize and enforce the uniqueness of solutions while determining a shape descriptor similarity metric between different feature contours.

An example correspondence data element for a first feature contour with respect to a second feature contour can include the correspondence data element "[[0.99, 0.7, 0.8], '1532ab']." In this example, 0.99 is the value representing a tentative similarity metric for the shape descriptors associated with the first feature contour, 0.7 is a value representing a tentative similarity metric for the contour size, 0.8 is a value representing a tentative similarity metric for the measurement depth, and '1532ab' is the identifier for the second feature contour. In some embodiments, the system can determine a correspondence data element for each unique pair of feature contours or even each unique point-to-point pair (i.e. pair of contour points between different contours).

At block 420, the system can generate a set of tentative point-to-point transformations based on contour descriptors for a set of sampled points. In some embodiments, the tentative point-to-point transformations can be generated using a multi-dimensional spline method. For example, the system can use a two-dimensional generalization of a cubic spline, such as a thin plate spline (TPS) model. NOTE: CAN WE INCLUDE AN EXAMPLE FUNCTION HERE?. In some embodiments, with reference to FIG. 3 above, the point-to-point transformation can be directly used as a contour connection as described above for block 324.

At block 424, the system generates a set of contour similarity metrics based on the contour descriptors and tentative point-to-point transformations. The system can generate the shape similarity metric by using the similarity data elements described above for block 412 and incorporating a transformation difference metric into the similarity data elements. In some embodiments, the transformation difference metric can be a metric that measures the magnitude of the respective TPS transformations corresponding with each of the tentative point-to-point pairs. The similarity metric can then be computed as a sum of matching errors (or functions of matching errors) between associated contour points and the term that measures the magnitude of the TPS transformation.

At block 428, the system determines whether the set of similarity metrics satisfy a set of attribute similarity thresholds. A feature contour can be associated with an object based on the feature contour satisfying the set of attribute similarity thresholds. In some embodiments, the system can require that more than one attribute similarity threshold be satisfied. In some embodiments, the attribute similarity thresholds can be predetermined or configurable. For example, the system can include attribute similarity thresholds that are satisfied when differences in intensity, size, and depth are less than or equal to all of a set of attribute threshold values, wherein the attribute threshold values include an intensity threshold, size threshold, and depth threshold. Alternatively, or in addition, the system can include an adaptive threshold to adjust attribute threshold values based on scan results. For example, the system can determine that an attribute similarity threshold can be satisfied under the condition that two feature contours are within the same intensity range and do not satisfy that attribute similarity threshold otherwise. If the system determines that the similarity metrics do not satisfy the set of attribute similarity thresholds, the system can proceed to block 432. Otherwise, the system can proceed to block 436.

At block 432, the system modifies the correspondence values and/or the tentative point-to-point transformations. The system can modify the correspondence values by re-determining the contour descriptors. For example, the system can change the minimum size threshold to include smaller contours as feature contours. Alternatively, or in addition, the system can modify the values used for weights/values during the generation of the tentative point-to-point transformations. For example, the system can add, remove, or change a term in a multi-dimensional spline function used to generate the tentative point-to-point transformations.

At block 436, the system generates object associations based on the set of correspondence values. If a contour has more than one correspondence value, the system can associate a first contour to a second contour based on which of the correspondence values are greatest. For example, if a first contour has a normalized correspondence value of 0.9 for a second contour and a normalized correspondence value of 0.89 for a third contour, the system can generate an object association between the first contour and the second contour instead of the first contour and third contour. Once the object associations are generated, operations of the flowchart 400 can be complete.

Example Data

Figure 5:
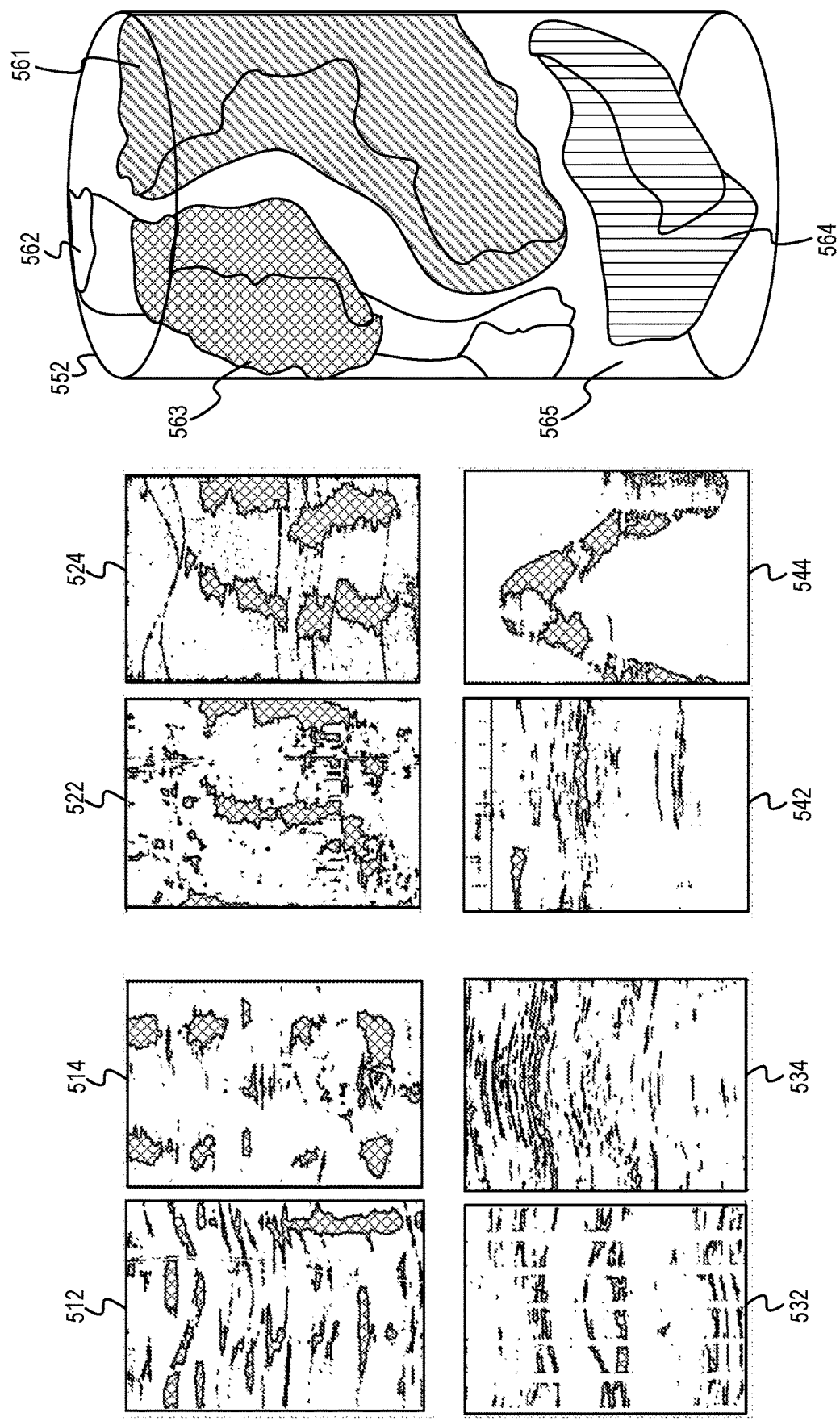
FIG. 5 depicts a set of borehole scan results and a resulting three-dimensional reconstructed core generated using a core reconstruction method.

FIG. 5 depicts a set of borehole scan results and a resulting three-dimensional reconstructed core generated using a core reconstruction method. The scan result 512 and scan result 514 represent scan results for a core sample using an acoustic scanning tool at a lower intensity bin and a greater intensity bin, respectively. The scan result 522 and scan result 524 represent scan results for the same core sample using an ultrasound scanning tool at a lower intensity bin and greater intensity bin, respectively. The scan result 532 and scan result 534 represent scan results for the same core sample using a resistivity scanning tool at a lower intensity bin and greater intensity bin, respectively. The scan result 542 and scan result 544 represent scan results for the same core sample using an optical scanning tool at a lower intensity bin and greater intensity bin, respectively. By combining each of the eight scans, the system can be used to generate a reconstructed core 552, wherein the reconstructed core 552 includes the distinctive objects 561-564 as well as background object 565. For example, the distinctive object 561 is shown as a three-dimensional object within the reconstructed core 552 and is distinct from the background object 565 and is constructed from applying the operations described above based on scans such as the scan results 512-544.

Figure 6:
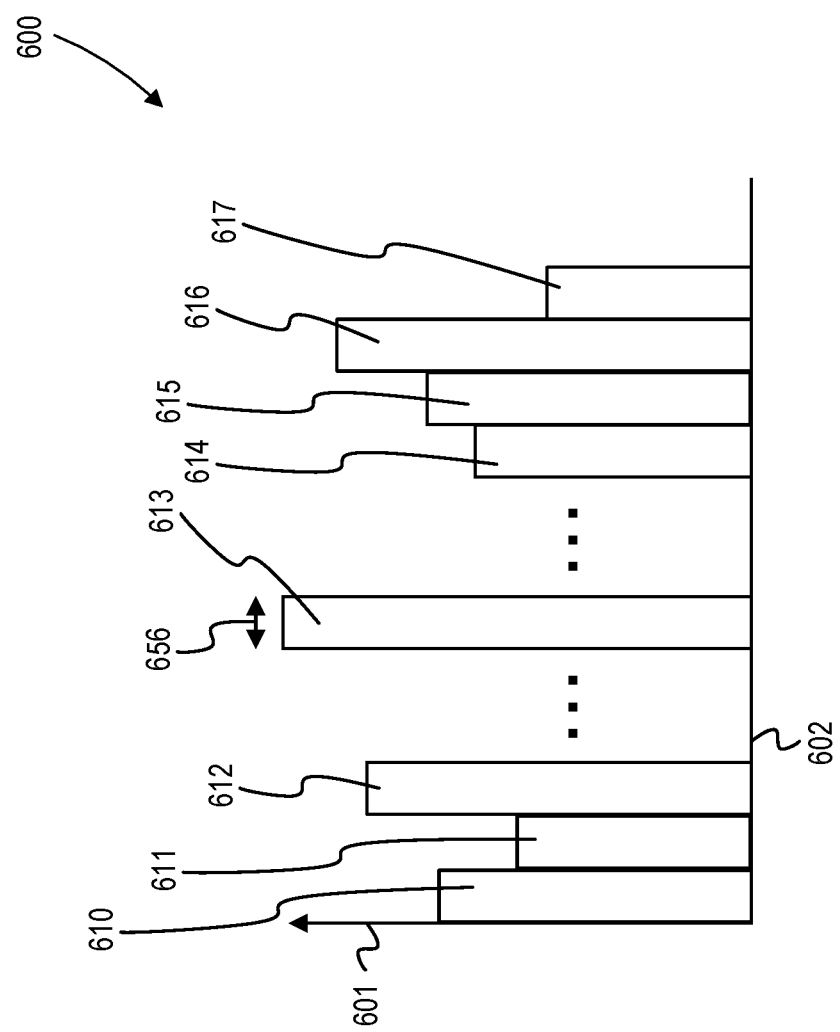
FIG. 6 depicts an example histogram representing the intensity ranges used to generate an initial set of digitized scan results corresponding with different intensity bins.

FIG. 6 depicts an example histogram representing the intensity ranges used to generate an initial set of digitized scan results corresponding with different intensity bins. The vertical axis 601 of the intensity histogram 600 represents a count of pixels. The horizontal axis 602 of the intensity histogram 600 corresponds with the intensity and can be shown in any type of unit or be unitless (e.g. a normalized unit). An initial scan result having a range of intensity values can be divided into a set of M intensity measurement bins, including the intensity bins 610-617. The width shown in a range 656 represents the intensity range of a single bin.

Figure 7:
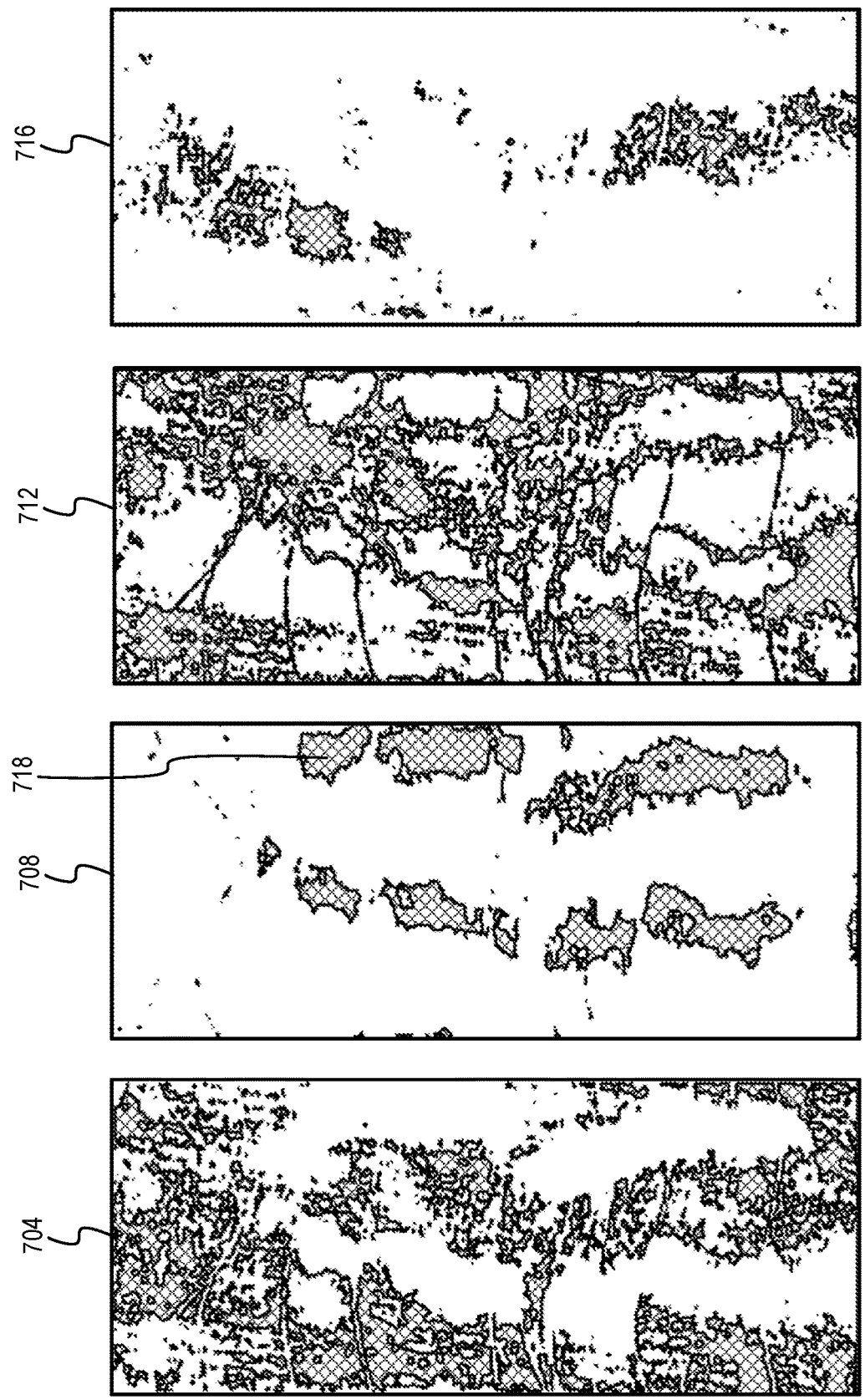
FIG. 7 depicts an initial set of digitized masks, each corresponding with a different intensity bin.

FIG. 7 depicts an initial set of digitized masks, each corresponding with a different intensity bin. Each of the digitized masks 704, 708, 712, and 716 correspond to one of four intensity bins generated by a system performing histogram pre-processing. For example, the digitized mask 704 can correspond with the intensity range of [0-0.25) dimensionless units, the digitized mask 708 can correspond with the intensity range of [0.25-0.50) dimensionless units, the digitized mask 712 can correspond with the intensity range of [0.50-0.75) dimensionless units, and the digitized mask 716 can correspond with the intensity range of [0.75-1.00]

dimensionless units. Each of the boundaries of the cross-hatched regions in the digitized masks can be detected as a contour by a system during a segmentation process. For example, the boundaries of the cross-hatched region 718 can be detected as a contour during a segmentation process.

Figure 8:
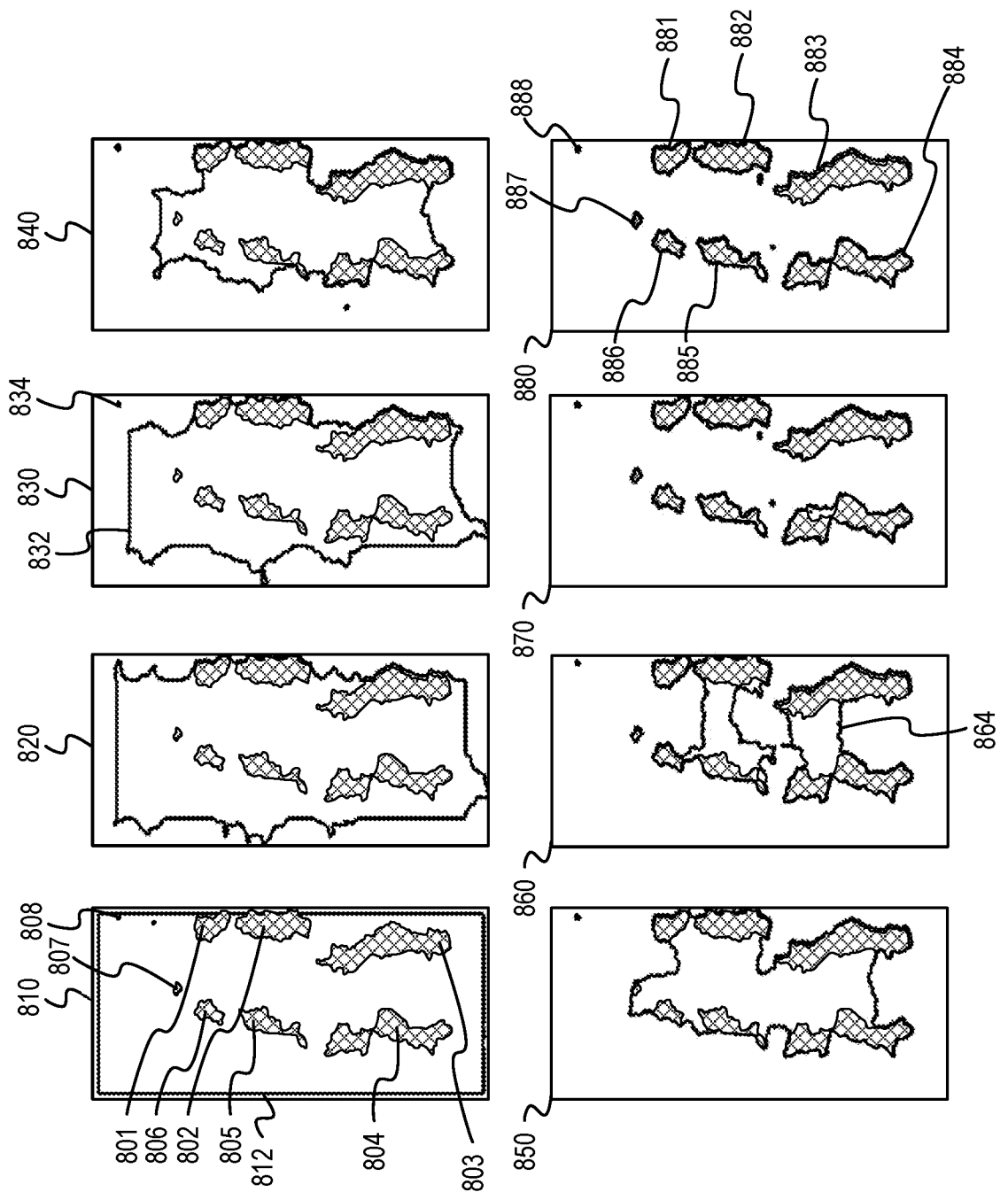
FIG. 8 depicts a segmentation of a digitized mask using a level set method.

FIG. 8 depicts a segmentation of a digitized mask using a level set method. Each of the overlaid masks 810, 820, 830, 840, 850, 860, 870, and 880 shows an iteration during a level set evolution process. Each of the overlaid masks shows elevated regions 801-808 representing regions of elevated intensity values determined from a digitized mask. The overlaid mask 810 comprises the mask and an initial contour 812 that covers a large area of the initial mask. After ten iterations during the level set evolution process, the system can generate an overlaid mask 820, wherein the contour 822 shows the formation of contours around the elevated regions 801-803 and elevated region 808 as the contour evolves inward and stops at the feature boundaries after a number of splitting and merging operations. As shown in the overlaid masks 820-880, the level set evolution process produces in contour shape changes that accommodate for detected shapes. In some embodiments, a particular feature may end up getting represented by multiple smaller contour clusters. For example, as shown in comparing the overlaid masks 820 and 830, continued level set evolution can result in the initial contour 822 split into multiple contours 832 and 834. The process of segmenting the borehole images can provide a means of determining the quantity of the position and extent of the features in borehole sample. As shown by the overlaid mask 880 representing the contours at an example last iteration, the various elevated regions can be completely surrounded at their perimeters by a contour. As shown in the overlaid mask 880, each of the elevated regions 801-808 are surrounded by contours defined at contours 881-888.

Figure 9:
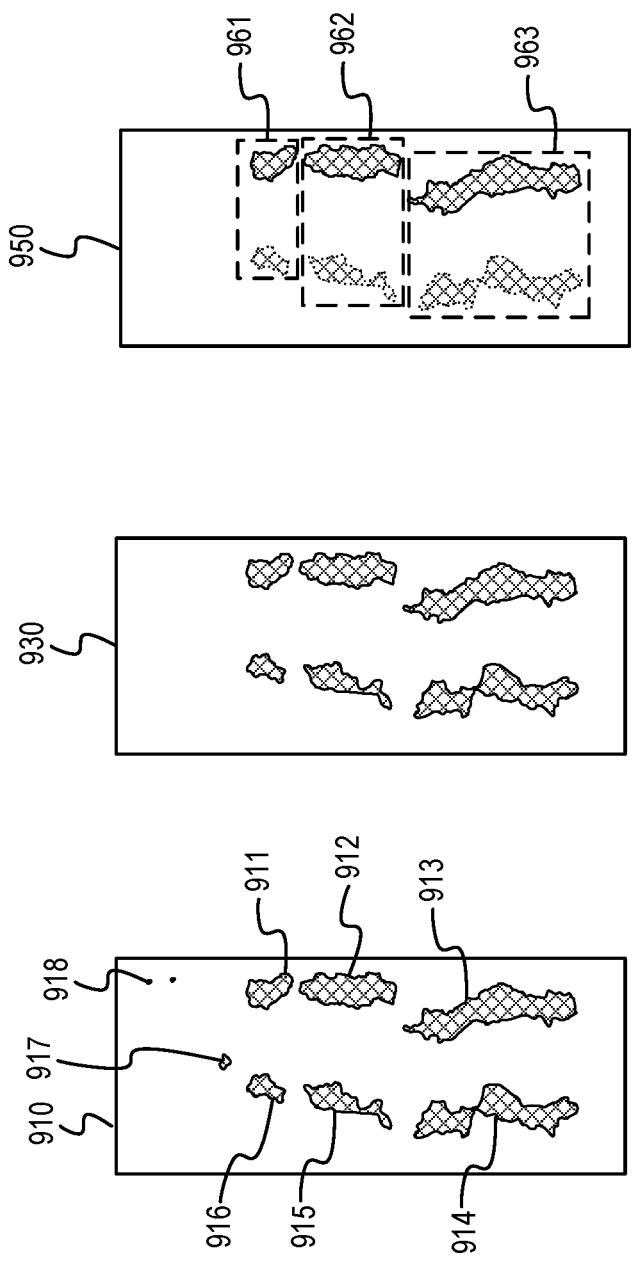
FIG. 9 depicts visual representations of operations during the generation of object associations beginning with feature contours and ending with a set of object associations.

FIG. 9 depicts visual representations of operations during the generation of object associations beginning with feature contours and ending with a set of object associations. Each of the cross-hatched regions shown in the overlaid mask 910 represent an area surrounded by a set of contours, wherein the set of contours includes the feature contours 911-918. With reference to FIG. 8, each of the feature contours 911-918 can be based on, or be the same as, the contours 881-888 represented in the overlaid mask 880.

Using size filtering operations, the system can filter out contours having an area smaller than a size threshold. For example, with reference to FIG. 4 above, the system can apply a size threshold filter described above for block 404 to filter out the feature contours 918 and 917, wherein the result of such filtering is represented in the overlaid mask 930. The system can then associate contours into multi-contour sets and associate the multi-contour sets with objects. For example, as shown in the overlaid mask 950, the feature contour 911 can be associated with the contour 916, the contour 912 can be associated with the contour 915, and the contour 913 can be associated with the contour 914.

Figure 10:
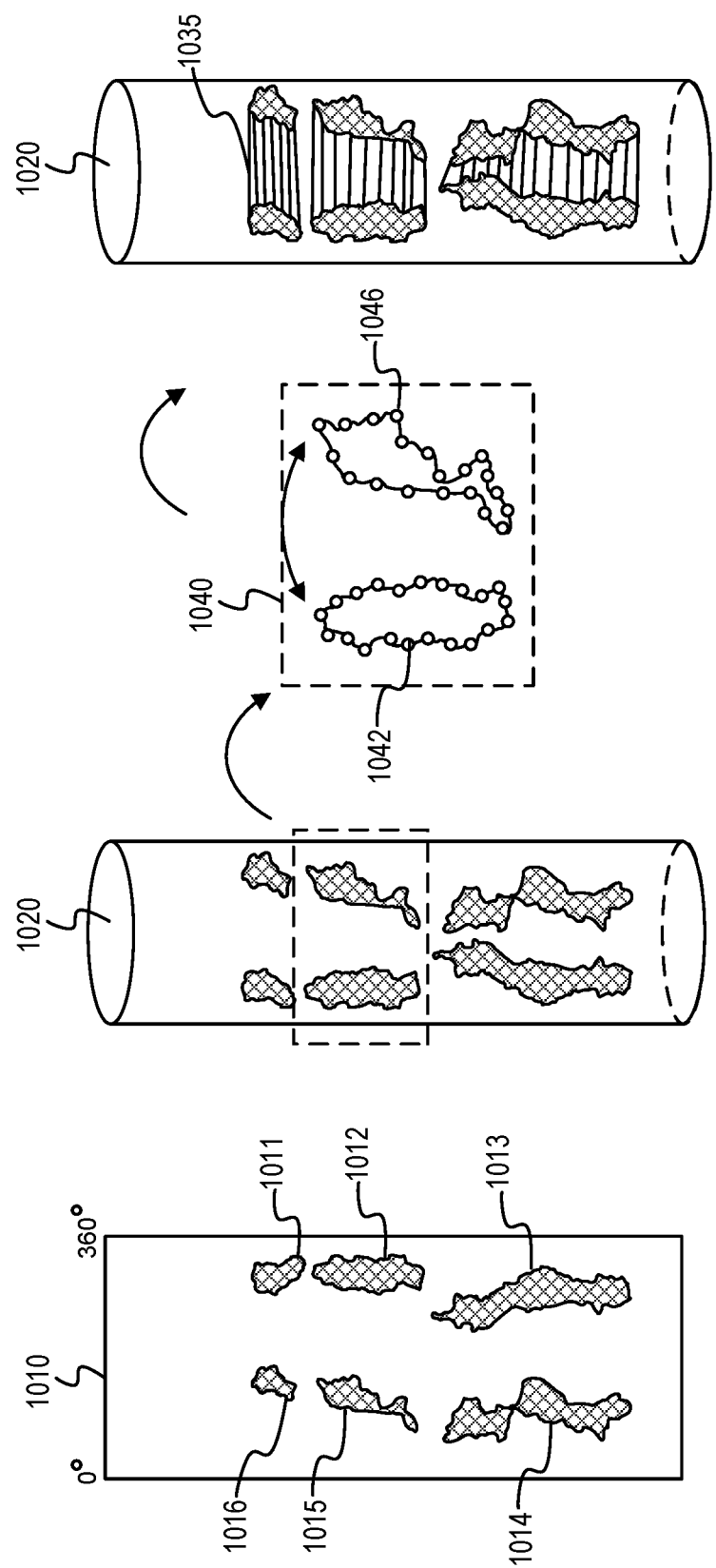
FIG. 10 depicts visual representations of operations during the generation of contour connections beginning with feature contours and ending with a set of contour connections.

FIG. 10 depicts visual representations of operations during the generation of contour connections beginning with feature contours and ending with a set of contour connections. The feature contours 1011-1016 shown in the overlaid mask 1010 can be projected into a partially reconstructed core 1020. Each of the set of feature contours 1011-1016 can be pre-associated to one of the others of the set of feature contours 1011-1016. A system can generate a set of contour points for the feature contours having object associations. For example, the visualization window 1040 shows a first set of contour points 1042 that correspond with the feature contour 1015 and a second set of contour points 1046 that correspond with the feature contour 1012. The system can then generate a set of contour connections using the contour points. For example, with reference to FIGS. 3-4, the system can use the tentative point-to-point transformations described for block 424 as the contour connections described for block 324. Contour connections can be visualized in the partially reconstructed core 1020, which shows a set of contour connections 1035 which form the boundaries of an object associated with the feature contours 1012 and 1015 in the partially reconstructed core 1020.

Figure 11:
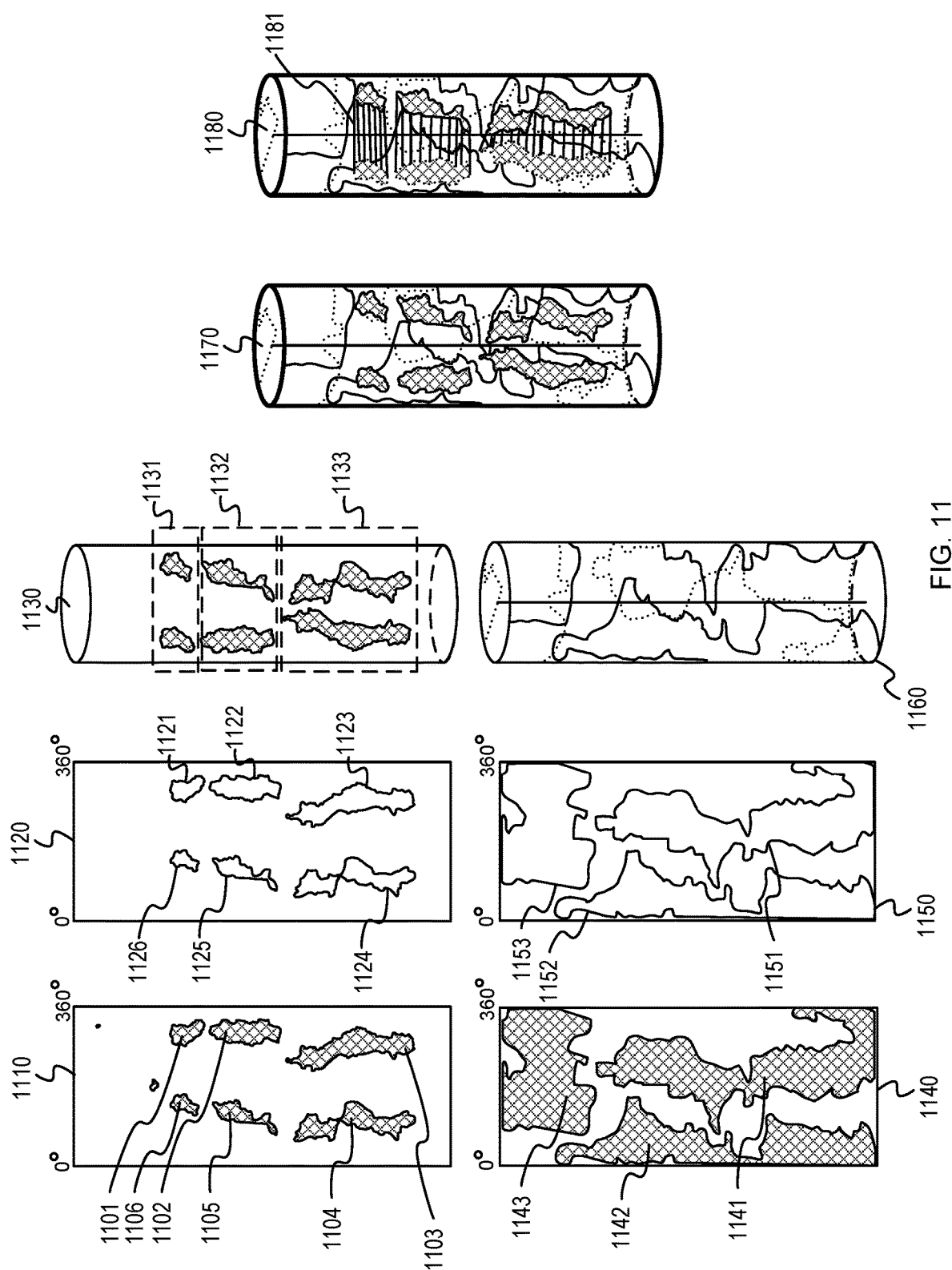
FIG. 11 depicts visual representations of operations during the generation of contour connections beginning with a set of digitized masks and ending with a partially reconstructed core.

FIG. 11 depicts visual representations of operations during the generation of contour connections beginning with a set of digitized masks and ending with a partially reconstructed core. The mask 1110 includes elevated regions 1101-1106 acquired from a digitized mask generated from a first intensity range, wherein each of the elevated regions correspond with spatial coordinates having an increased intensity value in a scan result within the first intensity range. With reference to FIG. 3, the system can generate a set of contours 1121-1126 shown in the visualization 1120 using operations similar to operations described for block 308. The system can also project the set of contours 1121-1126 onto a first core sample scan result surface 1130 using operations similar to operations described for block 320. In addition, with further reference to FIG. 4, the system can determine associations between the set of contours 1121-1126 to generate the first object association 1131, the second object association 1132, and the third object association 1133 using operations described in flowchart 400.

Similarly, the mask 1140 includes elevated regions 1141-1143 acquired from a digitized mask generated from a second intensity range, wherein each of the elevated regions 1141-1143 correspond with spatial coordinates having an increased intensity value in a scan result within the second intensity range. With reference to FIG. 3, the system can generate a set of contours 1151-1153 shown in the visualization 1150 using operations similar to operations described for block 308. The system can also project the set of contours 1161-1163 onto a second core sample scan result surface 1160 using operations similar to operations described for block 320.

Multiple core sample surfaces corresponding with different masks can be combined before reconstructing a core. For example, the system can combine first core sample scan result surface 1130 and the second core sample scan result surface 1160 to form the combined core sample scan result surface 1170. In addition, with reference to FIG. 3, object associations of the contours can be used to generate a set of contour connections such as the contour connections 1181 using operations similar to those described for blocks 320-332 in order to generate the partially reconstructed core 1180.

Figure 12:
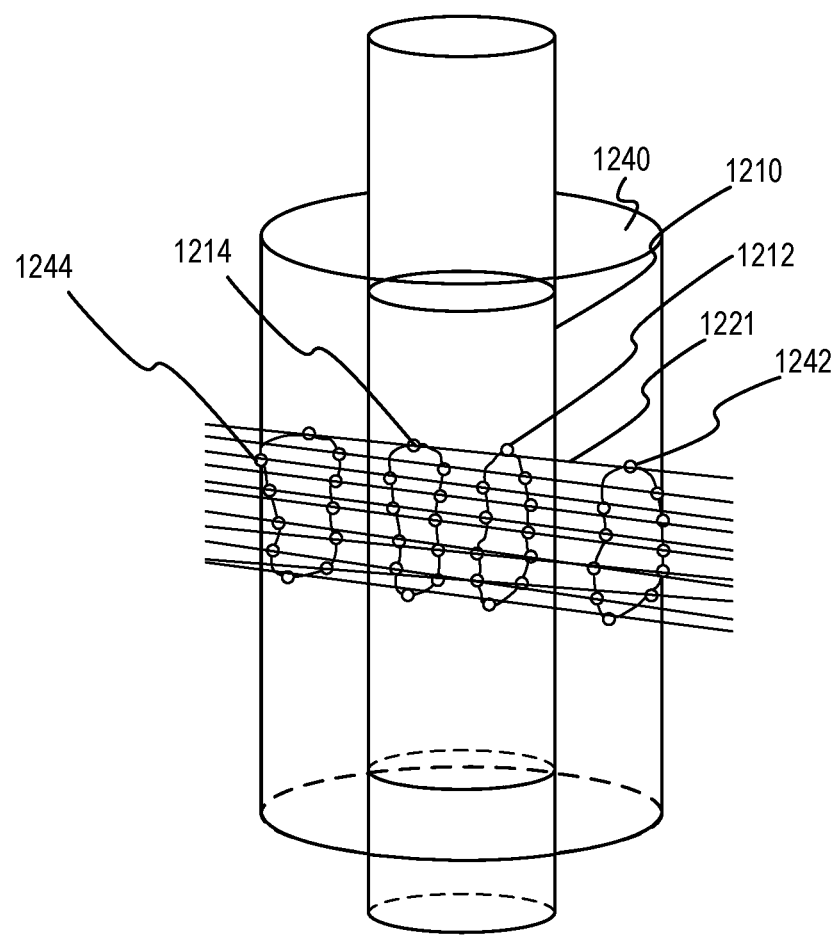
FIG. 12 depicts an example partially reconstructed core generated based on contour connections using an extrapolation method.

FIG. 12 depicts an example partially reconstructed core generated based on contour connections using an extrapolation method. The reconstructed core 1210 is a first reconstructed core having the same dimensions as an initial core sample used to generate the set of contour connections 1221. Each of the set of contour connections 1221 connect with at least one of a first set of contour points 1212 from a first contour and at least one of a second set of contour points 1214 from a second contour. After determining the dimensions of a second reconstructed core 1240, the system can generate projections of a third set of contour points 1242 and fourth set of contour points 1244. Each of the third set of contour points 1242 and fourth set of contour points 1244 can be used to determine the positions, size, orientation, etc.

of a new set of contours with the object associations already determined by their corresponding contour connections. While shown as a cylinder that is greater in size than the first reconstructed core, the shape and size of the second reconstructed core can be set to any arbitrary three dimensional size and shape.

Figure 13:
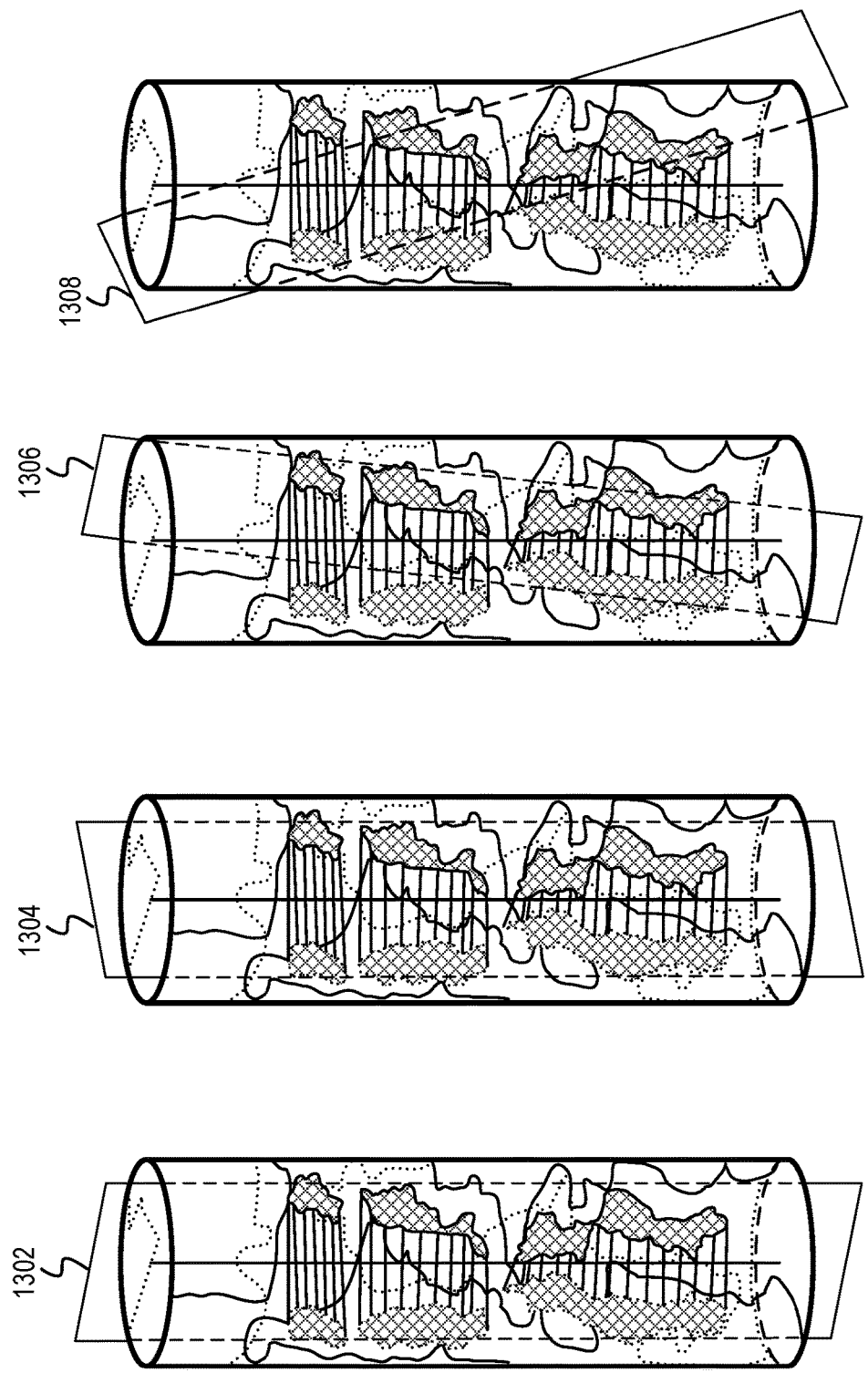
FIG. 13 depicts a simulated slabbing of a reconstructed core.

FIG. 13 depicts a simulated slabbing of a reconstructed core. With reference to FIG. 11 above, the partially reconstructed core 1310 shown in FIG. 13 can be similar to, or the same as, the partially reconstructed core 1180. Each of the slices 1301, 1302, 1303, and 1304 represent different virtual slices of the partially reconstructed core 1310. In some embodiments, the system can fully generate a reconstructed core before slabbing the reconstructed core. In addition, with reference to FIG. 3, the system can apply other operations described for block 340 to determine formation properties based on the reconstructed core.

Example Computer Device

Figure 14:
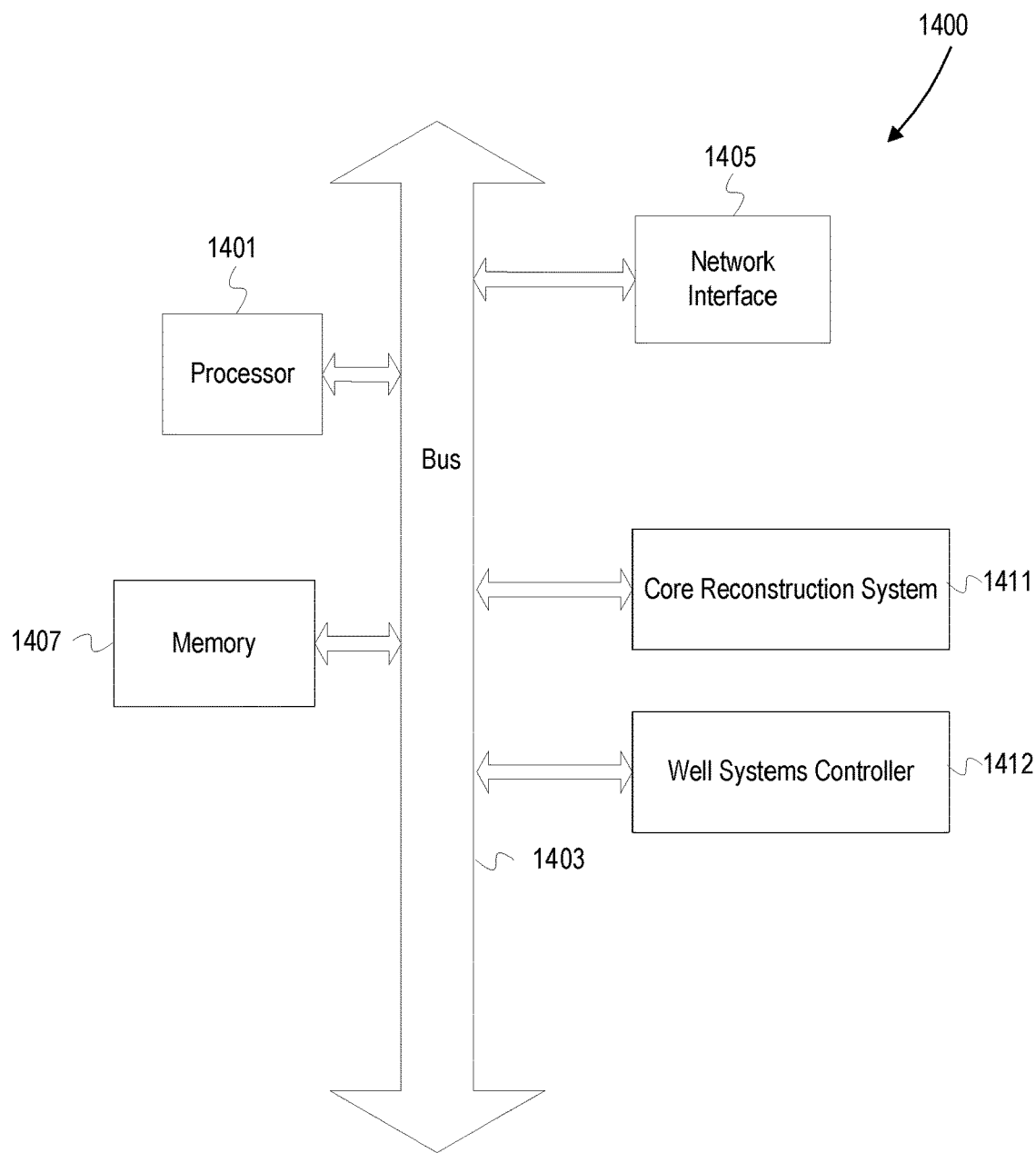
FIG. 14 depicts an example computer device.

FIG. 14 depicts an example computer device. A computer device 1400 includes a processor 1401 (possibly including multiple processors, multiple cores, multiple nodes, and/or implementing multi-threading, etc.). The computer device 1400 includes a memory 1407. The memory 1407 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1400 also includes a bus 1403 (e.g., PCI, ISA, PCI-Express, HyperTransport® bus, InfiniBand® bus, NuBus, etc.) and a network interface 1405 (e.g., a Fiber Channel interface, an Ethernet interface, an internet small computer system interface, SONET interface, wireless interface, etc.).

In some embodiments, the computer device 1400 includes a core reconstruction system 1411 and well system controller 1412. The core reconstruction system 1411 can perform one or more operations for generating a reconstructed core, including generating object associations and/or contour connections. A well system controller 1412 can also perform one or more operations for controlling a drilling system, well treatment system, or wireline system. For example, the well system controller can modify the direction of drill bit, modify the speed of a wireline tool being lowered into a borehole, or change the pump rate of a fluid into a borehole. Any one of the previously described functionalities can be partially (or entirely) implemented in hardware and/or on the processor 1401. For example, the functionality can be implemented with an application specific integrated circuit, in logic implemented in the processor 1401, in a co-processor on a peripheral device or card, etc. Further, realizations can include fewer or additional components not illustrated in FIG. 14 (e.g., video cards, audio cards, additional network interfaces, peripheral devices, etc.). The processor 1401 and the network interface 1405 are coupled to the bus 1403. Although illustrated as being coupled to the bus 1403, the memory 1407 can be coupled to the processor 1401. The computer device 1400 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Additional Terminology and Variations

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Use of the term "set" can be treated as meaning "group having at least one of" For example, "set of items" can be treated as meaning "group of items having at least one item." A dimensional or composition comparison (e.g. comparisons in shape, height, radius, mineralogical composition, etc.) of a metric between a reconstructed core and a core sample should be understood to mean a comparison of that metric between the reconstructed core and a virtual representation of the core sample. For example, a comparison in height between a reconstructed core and a core sample means comparing the height for the reconstructed core and the height of a virtual representation of the core sample.

EXAMPLE EMBODIMENTS

Example embodiments include the following:

Embodiment 1: An apparatus comprising: a processor; and a machine-readable medium having program code executable by the processor to cause the apparatus to, obtain a scan result based on a core sample having a core sample surface area; generate a set of contours of the scan result, wherein the set of contours comprise at least two contours; generate a set of object associations, wherein the set of object associations comprises a first object association that is associated with a first contour from the set of contours and a second contour from the set of contours; generate a set of contour connections, wherein the set of contour connections comprises a first contour connection that is based on the first object association; and generate a reconstructed core having a three-dimensional space based on the set of contour connections, wherein the three-dimensional space comprises a volume greater than the core sample.

Embodiment 2: The apparatus of Embodiment 1, wherein the program code to generate the set of contours of the scan result comprises program code to: generate a set of digitized masks, wherein each digitized mask of the set of digitized masks corresponds with a different intensity range from any other digitized mask of the set of digitized masks; and generate the set of contours based on the set of digitized masks.

Embodiment 3: The apparatus of Embodiments 1 or 2, wherein the program code to generate the set of contours of the scan result comprises program code to generate the set of contours using an iterative application of a level set evolution method based on the scan result, a level set function, and an edge indicator function.

Embodiment 4: The apparatus of any of Embodiments 1-3, wherein the program code to generate the set of object associations comprises program code to: generate a first set of contour points corresponding with the first contour, wherein a first point in the first set of contour points is associated with a first shape descriptor; generate a second set of contour points corresponding with the second contour, wherein a second point in the second set of contour points is associated with a second shape descriptor; determine a correspondence relationship between the first set of contour points and the second set of contour points based on the first shape descriptor and the second shape descriptor; determine a similarity metric based on the correspondence relationship; and generate the first objection association by associating the first contour and the second contour based on the similarity metric satisfying the similarity metric threshold.

Embodiment 5: The apparatus of any of Embodiments 1-4, wherein the program code to generate the set of contour connections comprises program code to: generate a first set of contour points corresponding with spatial positions of the first contour projected onto a first surface, wherein the first surface has a surface area equal to the core sample surface area; generate a second set of contour points corresponding with spatial positions of the second contour projected onto the first surface; and generate the first contour connection, wherein the first contour connection intersects a first point in the first set of contour points and a second point in the second set of contour points.

Embodiment 6: The apparatus of any of Embodiments 1-5, wherein the program code to generate the set of contour connections comprises program code to: generate a third set of contour points corresponding with spatial positions of a third contour projected onto the first surface; generate a fourth set of contour points corresponding with spatial positions of a fourth contour projected onto the first surface; generate an initial second contour connection, wherein the initial second contour connection intersects a third point in in the third set of contour points and a fourth point in the fourth set of contour points; determine whether the initial second contour connection satisfies a distance threshold based on the first contour connection; and based on the initial second contour connection not satisfying the distance threshold, generate a modified second contour connection intersecting the third point in in the third set of contour points and the fourth point in the fourth set of contour points.

Embodiment 7: The apparatus of any of Embodiments 1-6, wherein the program code to generate the reconstructed core comprises program code to extrapolate the set of contour connections to a boundary of the reconstructed core.

Embodiment 8: The apparatus of any of Embodiments 1-7, further comprising a scanning tool, wherein the program code to obtain the scan result comprises program code to scan an inner wall of a borehole using the scanning tool.

Embodiment 9: The apparatus of any of Embodiments 1-8, wherein the scanning tool is at least one of a wireline tool or a logging-while-drilling tool.

Embodiment 10: A method for generating a reconstructed core comprising: obtaining a scan result based on a core sample having a core sample surface area; generate a set of contours of the scan result, wherein the set of contours comprise at least two contours; generating a set of object associations, wherein the set of object associations comprises a first object association that is associated with a first contour from the set of contours and a second contour from the set of contours; generating a set of contour connections, wherein the set of contour connections comprises a first contour connection that is based on the first object association; and generating the reconstructed core based on the set of contour connections, wherein the reconstructed core has a three-dimensional space, and wherein the three-dimensional space comprises a volume greater than the core sample.

Embodiment 11: The method of Embodiment 10, further comprising: generating a set of digitized masks, wherein each digitized mask of the set of digitized masks corresponds with a different intensity range from any other digitized mask of the set of digitized masks; and generating the set of contours based on the set of digitized masks.

Embodiment 12: The method of Embodiments 10 or 11, wherein generating the set of contours of the scan result comprises generating the set of contours using an iterative application of a level set evolution method based on the scan result, a level set function, and an edge indicator function.

Embodiment 13: The method of any of Embodiments 10-12, wherein generating the set of object associations comprises: generating a first set of contour points corresponding with the first contour, wherein a first point in the first set of contour points is associated with a first shape descriptor; generating a second set of contour points corresponding with the second contour, wherein a second point in the second set of contour points is associated with a second shape descriptor; determining a correspondence relationship between the first set of contour points and the second set of contour points based on the first shape descriptor and the second shape descriptor; determining a similarity metric based on the correspondence relationship; and generating the first objection association by associating the first contour and the second contour based on the similarity metric satisfying the similarity metric threshold.

Embodiment 14: The method of any of Embodiments 10-13, wherein generating the set of contour connections comprises: generating a first set of contour points corresponding with spatial positions of the first contour projected onto a first surface, wherein the first surface has a surface area equal to the core sample surface area; generating a second set of contour points corresponding with spatial positions of the second contour projected onto the first surface; and generating the first contour connection, wherein the first contour connection intersects a first point in the first set of contour points and a second point in the second set of contour points.

Embodiment 15: The method of any of Embodiments 10-14, wherein generating the reconstructed core comprises extrapolating the set of contour connections to a boundary of the reconstructed core.

Embodiment 16: One or more non-transitory machine-readable media comprising program code for generating a reconstructed core, the program code to: obtain a scan result based on a core sample having a core sample surface area; generate a set of contours of the scan result, wherein the set of contours comprise at least two contours; generate a set of object associations, wherein the set of object associations comprises a first object association that is associated with a first contour from the set of contours and a second contour from the set of contours; generate a set of contour connections, wherein the set of contour connections comprises a first contour connection that is based on the first object association; and generate the reconstructed core based on the set of contour connections, wherein the reconstructed core has a three-dimensional space, and wherein the three-dimensional space comprises a volume greater than the core sample.

Embodiment 17: The one or more non-transitory machine-readable media of Embodiment 16, further comprising program code to: generate a set of digitized masks, wherein each digitized mask of the set of digitized masks corresponds with a different intensity range from any other digitized mask of the set of digitized masks; and generate the set of contours based on the set of digitized masks.

Embodiment 18: The one or more non-transitory machine-readable media of Embodiments 16 or 17, wherein the program code to generate the set of object associations comprises program code to: generate a first set of contour points corresponding with the first contour, wherein a first point in the first set of contour points is associated with a first shape descriptor; generate a second set of contour points corresponding with the second contour, wherein a second point in the second set of contour points is associated with a second shape descriptor; determine a correspondence relationship between the first set of contour points and the second set of contour points based on the first shape descriptor and the second shape descriptor; determine a similarity metric based on the correspondence relationship; and generate the first objection association by associating the first contour and the second contour based on the similarity metric satisfying the similarity metric threshold.

Embodiment 19: The one or more non-transitory machine-readable media of any of Embodiments 16-18, wherein the program code to generate the set of contour connections comprises program code to: generate a first set of contour points corresponding with spatial positions of the first contour projected onto a first surface, wherein the first surface has a surface area equal to the core sample surface area; generate a second set of contour points corresponding with spatial positions of the second contour projected onto the first surface; and generate the first contour connection, wherein the first contour connection intersects a first point in the first set of contour points and a second point in the second set of contour points.

Embodiment 20: The one or more non-transitory machine-readable media of any of Embodiments 16-19, wherein the program code to generate the reconstructed core comprises program code to extrapolate the set of contour connections to a boundary of the reconstructed core.

What is claimed is:

1. An apparatus comprising:
    a scanning tool configured to scan a borehole within a subsurface formation to generate a scan result;
    a processor; and
    a machine-readable medium having program code executable by the processor to cause the apparatus to,
        obtain, from the scanning tool, the scan result based on a core sample having a core sample surface area;
        generate a set of contours of the scan result, wherein the set of contours comprise at least two contours;
        generate a set of object associations, wherein the set of object associations comprises a first object association that is associated with a first contour from the set of contours and a second contour from the set of contours;
        generate a set of contour connections, wherein the set of contour connections comprises a first contour connection that is based on the first object association;
        generate a reconstructed core having a three-dimensional space based on the set of contour connections, wherein the three-dimensional space comprises a volume greater than the core sample, and
        determine a subsurface formation property of the subsurface formation based on a core analysis of the reconstructed core.

2. The apparatus of claim 1, wherein the program code to generate the set of contours of the scan result comprises program code to:
    generate a set of digitized masks, wherein each digitized mask of the set of digitized masks corresponds with a different intensity range from any other digitized mask of the set of digitized masks; and
    generate the set of contours based on the set of digitized masks.

3. The apparatus of claim 1, wherein the program code to generate the set of contours of the scan result comprises program code to generate the set of contours using an iterative application of a level set evolution method based on the scan result, a level set function, and an edge indicator function.

4. The apparatus of claim 1, wherein the program code to generate the set of object associations comprises program code to:
generate a first set of contour points corresponding with the first contour, wherein a first point in the first set of contour points is associated with a first shape descriptor;
generate a second set of contour points corresponding with the second contour, wherein a second point in the second set of contour points is associated with a second shape descriptor;
determine a correspondence relationship between the first set of contour points and the second set of contour points based on the first shape descriptor and the second shape descriptor;
determine a similarity metric based on the correspondence relationship; and
generate the first objection association by associating the first contour and the second contour based on the similarity metric satisfying a similarity metric threshold.

5. The apparatus of claim 1, wherein the program code to generate the set of contour connections comprises program code to:
generate a first set of contour points corresponding with spatial positions of the first contour projected onto a first surface, wherein the first surface has a surface area equal to the core sample surface area;
generate a second set of contour points corresponding with spatial positions of the second contour projected onto the first surface; and
generate the first contour connection, wherein the first contour connection intersects a first point in the first set of contour points and a second point in the second set of contour points.

6. The apparatus of claim 5, wherein the program code to generate the set of contour connections comprises program code to:
generate a third set of contour points corresponding with spatial positions of a third contour projected onto the first surface;
generate a fourth set of contour points corresponding with spatial positions of a fourth contour projected onto the first surface;
generate an initial second contour connection, wherein the initial second contour connection intersects a third point in in the third set of contour points and a fourth point in the fourth set of contour points;
determine whether the initial second contour connection satisfies a distance threshold based on the first contour connection; and
based on the initial second contour connection not satisfying the distance threshold, generate a modified second contour connection intersecting the third point in in the third set of contour points and the fourth point in the fourth set of contour points.

7. The apparatus of claim 1, wherein the program code to generate the reconstructed core comprises program code to extrapolate the set of contour connections to a boundary of the reconstructed core.

8. The apparatus of claim 1, wherein the program code to obtain the scan result comprises program code to scan an inner wall of the borehole using the scanning tool.

9. The apparatus of claim 8, wherein the scanning tool is at least one of a wireline tool or a logging-while-drilling tool.

10. A method for determining a subsurface formation property from a reconstructed core comprising:
obtaining, from a scanning tool, a scan result of a borehole within a subsurface formation, the scan result based on a core sample having a core sample surface area;
generate a set of contours of the scan result, wherein the set of contours comprise at least two contours;
generating a set of object associations, wherein the set of object associations comprises a first object association that is associated with a first contour from the set of contours and a second contour from the set of contours;
generating a set of contour connections, wherein the set of contour connections comprises a first contour connection that is based on the first object association;
generating the reconstructed core based on the set of contour connections, wherein the reconstructed core has a three-dimensional space, and wherein the three-dimensional space comprises a volume greater than the core sample; and
determining the subsurface formation property of the subsurface formation based on a core analysis of the reconstructed core.

11. The method of claim 10, further comprising:
generating a set of digitized masks, wherein each digitized mask of the set of digitized masks corresponds with a different intensity range from any other digitized mask of the set of digitized masks; and
generating the set of contours based on the set of digitized masks.

12. The method of claim 10, wherein generating the set of contours of the scan result comprises generating the set of contours using an iterative application of a level set evolution method based on the scan result, a level set function, and an edge indicator function.

13. The method of claim 10, wherein generating the set of object associations comprises:
generating a first set of contour points corresponding with the first contour, wherein a first point in the first set of contour points is associated with a first shape descriptor;
generating a second set of contour points corresponding with the second contour, wherein a second point in the second set of contour points is associated with a second shape descriptor;
determining a correspondence relationship between the first set of contour points and the second set of contour points based on the first shape descriptor and the second shape descriptor;
determining a similarity metric based on the correspondence relationship; and
generating the first objection association by associating the first contour and the second contour based on the similarity metric satisfying a similarity metric threshold.

14. The method of claim 10, wherein generating the set of contour connections comprises:
generating a first set of contour points corresponding with spatial positions of the first contour projected onto a first surface, wherein the first surface has a surface area equal to the core sample surface area;
generating a second set of contour points corresponding with spatial positions of the second contour projected onto the first surface; and generating the first contour connection, wherein the first contour connection intersects a first point in the first set of contour points and a second point in the second set of contour points.

15. The method of claim 10, wherein generating the reconstructed core comprises extrapolating the set of contour connections to a boundary of the reconstructed core.

16. One or more non-transitory machine-readable media comprising program code for determining a subsurface formation property from a reconstructed core, the program code to:
obtain, from a scanning tool, a scan result of a borehole within a subsurface formation, the scan result based on a core sample having a core sample surface area;
generate a set of contours of the scan result, wherein the set of contours comprise at least two contours;
generate a set of object associations, wherein the set of object associations comprises a first object association that is associated with a first contour from the set of contours and a second contour from the set of contours;
generate a set of contour connections, wherein the set of contour connections comprises a first contour connection that is based on the first object association;
generate the reconstructed core based on the set of contour connections, wherein the reconstructed core has a three-dimensional space, and wherein the three-dimensional space comprises a volume greater than the core sample; and
determine the subsurface formation property of the subsurface formation based on a core analysis of the reconstructed core.

17. The one or more non-transitory machine-readable media of claim 16, further comprising program code to:
generate a set of digitized masks, wherein each digitized mask of the set of digitized masks corresponds with a different intensity range from any other digitized mask of the set of digitized masks; and
generate the set of contours based on the set of digitized masks.

18. The one or more non-transitory machine-readable media of claim 16, wherein the program code to generate the set of object associations comprises program code to:
generate a first set of contour points corresponding with the first contour, wherein a first point in the first set of contour points is associated with a first shape descriptor;
generate a second set of contour points corresponding with the second contour, wherein a second point in the second set of contour points is associated with a second shape descriptor;
determine a correspondence relationship between the first set of contour points and the second set of contour points based on the first shape descriptor and the second shape descriptor;
determine a similarity metric based on the correspondence relationship; and
generate the first objection association by associating the first contour and the second contour based on the similarity metric satisfying a similarity metric threshold.

19. The one or more non-transitory machine-readable media of claim 16, wherein the program code to generate the set of contour connections comprises program code to:
generate a first set of contour points corresponding with spatial positions of the first contour projected onto a first surface, wherein the first surface has a surface area equal to the core sample surface area;
generate a second set of contour points corresponding with spatial positions of the second contour projected onto the first surface; and
generate the first contour connection, wherein the first contour connection intersects a first point in the first set of contour points and a second point in the second set of contour points.

20. The one or more non-transitory machine-readable media of claim 16, wherein the program code to generate the reconstructed core comprises program code to extrapolate the set of contour connections to a boundary of the reconstructed core.

* * * * *